United States Patent [19]

Kang et al.

[11] Patent Number: 5,793,852
[45] Date of Patent: Aug. 11, 1998

[54] METHOD OF PROCESSING INFORMATION CHARGE DISCOUNT RATES FOR SERVICE SUBSCRIBERS IN PREMIUM-RATE SERVICE

[75] Inventors: Tae Gyu Kang; Hyun Joo Bae; Kyong Ok Yun, all of Yuseong-ku, Rep. of Korea

[73] Assignees: Electronics and Telecommunications Research Institute; Korea Telecommunication Authority, both of Rep. of Korea

[21] Appl. No.: 571,146

[22] Filed: Dec. 12, 1995

[30] Foreign Application Priority Data

Dec. 20, 1994 [KR] Rep. of Korea ............... 1994-35418

[51] Int. Cl.$^6$ .................. H04M 15/00; H04M 7/00
[52] U.S. Cl. ..................... 379/115; 379/121; 379/230
[58] Field of Search .......................... 379/111, 112, 379/114, 115–121, 133, 134, 207, 220, 229, 230

[56] References Cited

U.S. PATENT DOCUMENTS 5,381,467  1/1995  Rosinski et al. ............... 379/114
5,515,425  5/1996  Penzias et al. ............... 379/114
5,537,464  7/1996  Lewis et al. .................. 379/114

*Primary Examiner*—Curtis Kuntz
*Assistant Examiner*—Paul Loomis
*Attorney, Agent, or Firm*—Blakely Sokoloff Taylor & Zafman

[57] ABSTRACT

A method of processing information charge discount rates for service subscribers in a premium-rate service. Information charge discount rate data for each service subscriber is registered and a service subscriber number and a calling number are received from Service Switching Point. The received service subscriber number is designated as an index value of a main table in a service subscriber database and the main table is then retrieved to check whether data corresponding to the designated index value are present in the main table. If the data corresponding to the designated index value are present, a service feature classification data field in the main table is retrieved to check whether the service subscriber has subscribed to a flexible charging-by-day/time service. If the service subscriber has subscribed, data are read from a day/time classification data field in the main table, and a specific data information charge discount rate, a specific day information charge discount rate, a specific time information charge discount rate and a holiday information charge discount rate are calculated according to the read data. The calculated information charge discount rates are transmitted together with an information charge class and a called number to a service switching point.

11 Claims, 20 Drawing Sheets

FIG. 3

| SUBSCRIBER NUMBER DATA FIELD (pr_number) | | | |
|---|---|---|---|
| SERVICE STATUS/BILL VALIDATION DATA FIELD (validation) | | | |
| SERVICE FEATURE DATA FIELD (svc_type) | | | |
| SERVICE FEATURE CLASSIFICATION (sf_class) | BILLING TYPE (bill_type) | BASIC CHARGING INFORMATION (bcharge_information) | DAY/TIME CLASSIFICATION (fc_class) |
| TOTAL CALLED LINE NUMBER DATA FIELD (num_of_lines) | | | |

FIG. 4

| SUBSCRIBER NUMBER DATA FIELD (pr_number) | |
|---|---|
| DAY/TIME INFORMATION DATA FIELD (time_info) | |
| START/END TIME DATA FIELD (from_to) | |
| DESIGNATED START TIME (from) | DESIGNATED END TIME (to) |
| CHARGING RATE DATA FIELD (charge_rate) | |
| FIRST CHARGING RATE (charge_rate1) | SECOND CHARGING RATE (charge_rate2) |

DESIGNATED START TIME (from:1-96)

DESIGNATED END TIME (to:1-96)

HOURS, MINUTES, SECONDS IN 96 UNITS

| 00:00:00-00:14:59 | 00:15:00-00:29:59 | 00:30:00-00:44:59 | 00:45:00-00:59:59 | 01:00:00-01:14:59 | 01:15:00-01:29:59 | 01:30:00-01:44:59 | 01:45:00-01:59:59 |
|---|---|---|---|---|---|---|---|
| 1 | 2 | 3 | 4 | 5 | 6 | 7 | 8 |
| 02:00:00-02:14:59 | 02:15:00-02:29:59 | 02:30:00-02:44:59 | 02:45:00-02:59:59 | 03:00:00-03:14:59 | 03:15:00-03:29:59 | 03:30:00-03:44:59 | 03:45:00-03:59:59 |
| 9 | 10 | 11 | 12 | 13 | 14 | 15 | 16 |
| 04:00:00-04:14:59 | 04:15:00-04:29:59 | 04:30:00-04:44:59 | 04:45:00-04:59:59 | 05:00:00-05:14:59 | 05:15:00-05:29:59 | 05:30:00-05:44:59 | 05:45:00-05:59:59 |
| 17 | 18 | 19 | 20 | 21 | 22 | 23 | 24 |
| 06:00:00-06:14:59 | 06:15:00-06:29:59 | 06:30:00-06:44:59 | 06:45:00-06:59:59 | 07:00:00-07:14:59 | 07:15:00-07:29:59 | 07:30:00-07:44:59 | 07:45:00-07:59:59 |
| 25 | 26 | 27 | 28 | 29 | 30 | 31 | 32 |
| 08:00:00-08:14:59 | 08:15:00-08:29:59 | 08:30:00-08:44:59 | 08:45:00-08:59:59 | 09:00:00-09:14:59 | 09:15:00-09:29:59 | 09:30:00-09:44:59 | 09:45:00-09:59:59 |
| 33 | 34 | 35 | 36 | 37 | 38 | 39 | 40 |
| 10:00:00-10:14:59 | 10:15:00-10:29:59 | 10:30:00-10:44:59 | 10:45:00-10:59:59 | 11:00:00-11:14:59 | 11:15:00-11:29:59 | 11:30:00-11:44:59 | 11:45:00-11:59:59 |
| 41 | 42 | 43 | 44 | 45 | 46 | 47 | 48 |
| 12:00:00-12:14:59 | 12:15:00-12:29:59 | 12:30:00-12:44:59 | 12:45:00-12:59:59 | 13:00:00-13:14:59 | 13:15:00-13:29:59 | 13:30:00-13:44:59 | 13:45:00-13:59:59 |
| 49 | 50 | 51 | 52 | 53 | 54 | 55 | 56 |
| 14:00:00-14:14:59 | 14:15:00-14:29:59 | 14:30:00-14:44:59 | 14:45:00-14:59:59 | 15:00:00-15:14:59 | 15:15:00-15:29:59 | 15:30:00-15:44:59 | 15:45:00-15:59:59 |
| 57 | 58 | 59 | 60 | 61 | 60 | 61 | 62 |
| 16:00:00-16:14:59 | 16:15:00-16:29:59 | 16:30:00-16:44:59 | 16:45:00-16:59:59 | 17:00:00-17:14:59 | 17:15:00-17:29:59 | 17:30:00-17:44:59 | 17:45:00-17:59:59 |
| 65 | 66 | 67 | 68 | 69 | 70 | 71 | 72 |
| 18:00:00-18:14:59 | 18:15:00-18:29:59 | 18:30:00-18:44:59 | 18:45:00-18:59:59 | 19:00:00-19:14:59 | 19:15:00-19:29:59 | 19:30:00-19:44:59 | 19:45:00-19:59:59 |
| 73 | 74 | 75 | 76 | 77 | 78 | 79 | 80 |
| 20:00:00-20:14:59 | 20:15:00-20:29:59 | 20:30:00-20:44:59 | 20:45:00-20:59:59 | 21:00:00-21:14:59 | 21:15:00-21:29:59 | 21:30:00-21:44:59 | 21:45:00-21:59:59 |
| 81 | 82 | 83 | 84 | 85 | 86 | 87 | 88 |
| 22:00:00-22:14:59 | 22:15:00-22:29:59 | 22:30:00-22:44:59 | 22:45:00-22:59:59 | 23:00:00-23:14:59 | 23:15:00-23:29:59 | 23:30:00-23:44:59 | 23:45:00-23:59:59 |
| 89 | 90 | 91 | 92 | 93 | 94 | 95 | 96 |

FIG. 19

METHOD OF PROCESSING INFORMATION CHARGE DISCOUNT RATES FOR SERVICE SUBSCRIBERS IN PREMIUM-RATE SERVICE

BACKGROUND OF THE INVENTION

1. Field of the Invention

The present invention relates to a method of processing information charge discount rates for service subscribers in a premium-rate service.

2. Description of the Prior Art

A premium-rate service is a kind of intelligent network service. In the premium-rate service, a communication carrier is a network operator for providing a communication network, a service subscriber is an information provider for providing information, and a service user is provided with an information service through the communication network. The service user pays the communication carrier an information charge as well as a telephone charge for the information service. The communication carrier adjusts the received information charge with the information provider.

In other words, in the premium-rate service, the network operator acts as proxy for the information provider to receive the information charge for the information service provided for the service user. The network operator demands the sum of the information charge and the telephone charge for the information service from the service user. Then, the network operator deducts a commission and the telephone charge from the demanded sum and pays the balance to the information provider.

The premium-rate service has fundamental functions (features) such as information charge receipt agency and call hold with announcement and optional functions (service features) such as the flexible charging by day/time, the one number, the origin dependent routing, the mass calling, the call distribution, the call barring, and the measurements and report. The one number, the origin dependent routing, the call distribution and the flexible charging-by-day/time functions are stored in the form of database in an intelligent network service control/management system.

The intelligent network service control/management system is a database system comprising service control logic and data, which is the brain of intelligent network components. The intelligent network service control/management system requires a high flexibility in communication network and has characteristics such as a mass transaction process and an online real-time process.

Domestic telephone charge discount rates, for example, proposed by Korea Telecommunications Authority, Korea as of Nov. 8, 1994, are classified into two cases, standard and discount. The discount rate is 0% in the standard case and 30% in the discount case. The discount case is applied when a telephone call is made during intervals from 06:00 to 08:00 and from 21:00 to 24:00 on ordinary days, during intervals from 00:00 to 08:00 and from 16:00 to 24:00 on Saturday and during an interval from 00:00 to 24:00 on Sunday.

As mentioned above, a desired discount rate cannot be applied to each service subscriber, but the same discount rate is uniformly applied to all the service subscribers. Also, information charge discount rates cannot flexibly be applied according to various conditions such as a specific day, a specific time and etc.

SUMMARY OF THE INVENTION

Therefore, the present invention has been made in view of the above problems, and it is an object of the present invention to provide a method of processing information charge discount rates for service subscribers in an Premium-rate service in which each service subscriber designates desired information charge discount rates for a specific time (time of day), a specific day (day of week), a specific date (day of year) and a holiday to apply the designated information charge discount rates to service users.

In accordance with the present invention, the above and other objects can be accomplished by a provision of a method of processing information charge discount rates for service subscribers in an Premium-rate service, the Premium-rate service being applied to an intelligent network service control/management system, comprising the first step of registering information charge discount rate data for each service subscriber; the second step of receiving a service subscriber number and a calling number from service switching point, designating the received service subscriber number as an index value of a main table in a service subscriber database and retrieving the main table to check whether data corresponding to the designated index value are present in the main table; the third step of transmitting an error message and then ending the operation, if it is checked at the second step that the data corresponding to the designated index value are not present in the main table, and, if it is checked at the second step that the data corresponding to the designated index value are present in the main table, retrieving a service feature classification data field in the main table to check whether the service subscriber has subscribed to a flexible charging-by-day/time service; and the fourth step of producing an information charge class and a called number and transmitting the produced information charge class and called number and an information charge discount rate to a service switching point, if it is checked at the third step that the service subscriber has not subscribed to the flexible charging-by-day/time service, and, if it checked at the third step that the service subscriber has subscribed to the flexible charging-by-day/time service, reading data from a day/time classification data field in the main table, calculating a specific date information charge discount rate, a specific day information charge discount rate, a specific time information charge discount rate and a holiday information charge discount rate according to the read data from the day/time classification data field, producing an information charge class and a called number, transmitting the produced information charge class and called number and the calculated information charge discount rates to the service switching point and then ending the operation.

BRIEF DESCRIPTION OF THE DRAWINGS

The above and other objects, features and advantages of the present invention will be more clearly understood from the following detailed description taken in conjunction with the accompanying drawings, in which:

FIG. 3 is a view illustrating a structure of an Premium rate service subscriber main table which is applied to the present invention;

FIG. 4 is a view illustrating a format of an Premium-rate service subscriber flexible charging-by-day/time table which is applied to the present invention;

FIG. 19 is a table showing hours, minutes, and seconds in 96 units.

DETAILED DESCRIPTION OF THE PREFERRED EMBODIMENTS

Figure 1:
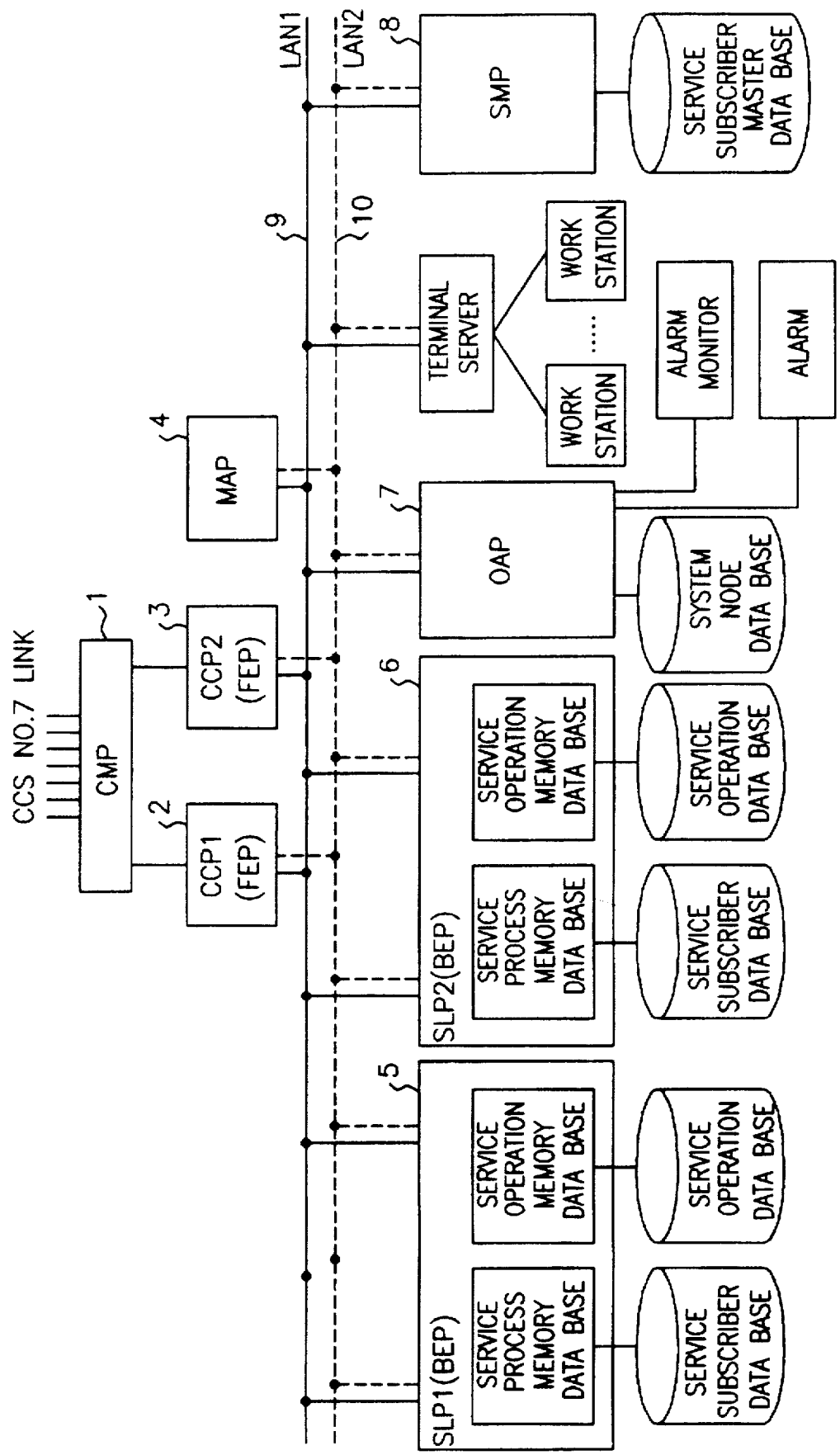
FIG. 1 is a block diagram of an intelligent network service control/management system to which the present invention is applied.

Referring to FIG. 1, there is shown a block diagram of an intelligent network service control/management system to which the present invention is applied. In this drawing, the reference numeral 1 designates a CCS7 message transfer part (MTP) processor (referred to hereinafter as CMP), the reference numerals 2 and 3 designate common channel signalling processors (referred to hereinafter as CCPs), the reference numeral 4 designates a minor operation and administration processor (referred to hereinafter as MAP), the reference numerals 5 and 6 designate service logic processors (referred to hereinafter as SLPs), the reference numeral 7 designates an operation and administration processor (referred to hereinafter as OAP), the reference numeral 8 designates a service management processor (referred to hereinafter as SMP), and the reference numerals 9 and 10 designate local area networks (referred to hereinafter as LANs).

In view of a service providing network, the intelligent network service control/management system is a combination of a service control point (SCP) and a service management system (SMS) which compositely accommodates functions thereof. The intelligent network service control/management system acts to control various communication network services by providing a proper answer to a query from a service switching system. In the intelligent network service control/management system, the CMP 1 is connected to a CCS7 link to receive a transaction in the form of signal protocol message. On the basis of the transaction received by the CMP 1, the CCP1 2 and the CCP2 3 process a transaction handler and a signalling control on a protocol layer. The processed results from the CCP1 2 and the CCP2 3 are transferred through the LAN1 9 and the LAN2 10 to the SLP1 5 and the SLP2 6 which process a dialogue handler on the protocol. The SLP1 5 and the SLP2 6 include service process memory databases and service operation memory databases, respectively. The SLP1 5 and the SLP2 6 produce responses associated with respective services on the basis of respective service logic data which are present in the service process memory databases and service operation memory databases. Then, the SLP1 5 and the SLP2 6 transfer the produced results in the reverse order to that mentioned above.

Noticeably, the intelligent network service control/management system has a duplex structure for the purpose of obtaining a high performance and a high reliability. At the normal state, the preceding and following processors 2, 3, 5 and 6 process the transaction equally. In the case where one part of the processors is abnormal, the other part being normal processes all loads.

The OAP 7 serves to perform functions necessary to the entire system operation such as system initialization, system configuration and operation data management, processor monitoring and switching, system resetting and etc. To this end, the OAP 7 includes a system node database. The MAP 4 serves to perform the above functions instead of the OAP 7 so that the system operation can be executed with no discontinuance.

In the SLP1 5 and the SLP2 6, the service logic data are present in the service process memory databases and service subscriber databases for the process of corresponding services. Such a duplex structure is provided to satisfy a real-time response characteristic of the service call process. To this end, the service process memory databases are provided with memory resident databases and the service subscriber databases are provided for the back-up and recovery of service logic data. For the purpose of providing an Premium-rate service, service subscriber data are dispersedly stored in a service subscriber master database of the SMP 8 and in the service process memory databases and service subscriber databases of the SLP1 5 and the SLP2 6. The service process memory databases and the service subscriber databases have substantially the same format and contents. In the preferred embodiment of the present invention, all the service process memory databases and the service subscriber databases may be Premium-rate service subscriber databases.

Also in the SLP1 5 and the SLP2 6, the service operation memory databases and service operation databases have the same format as those of the service process memory databases and service subscriber databases.

The SMP 8 serves to manage intelligent network service subscriber data and service operation status. The service subscriber master database is included in the SMP 8 to minimize any effect on the real-time service call process.

The databases of the intelligent network service control/management system are classified into service databases, node databases and master databases according to data formats and database characteristics. The service databases are classified into service subscriber databases, service operation databases and service local databases. The service subscriber databases and the service operation databases are directly connected with the present invention. The service subscriber databases are used to store data for admitting intelligent network service requirements from respective intelligent network service subscribers. The service operation databases are used to store data which can commonly be used by all the service subscribers.

Figure 2:
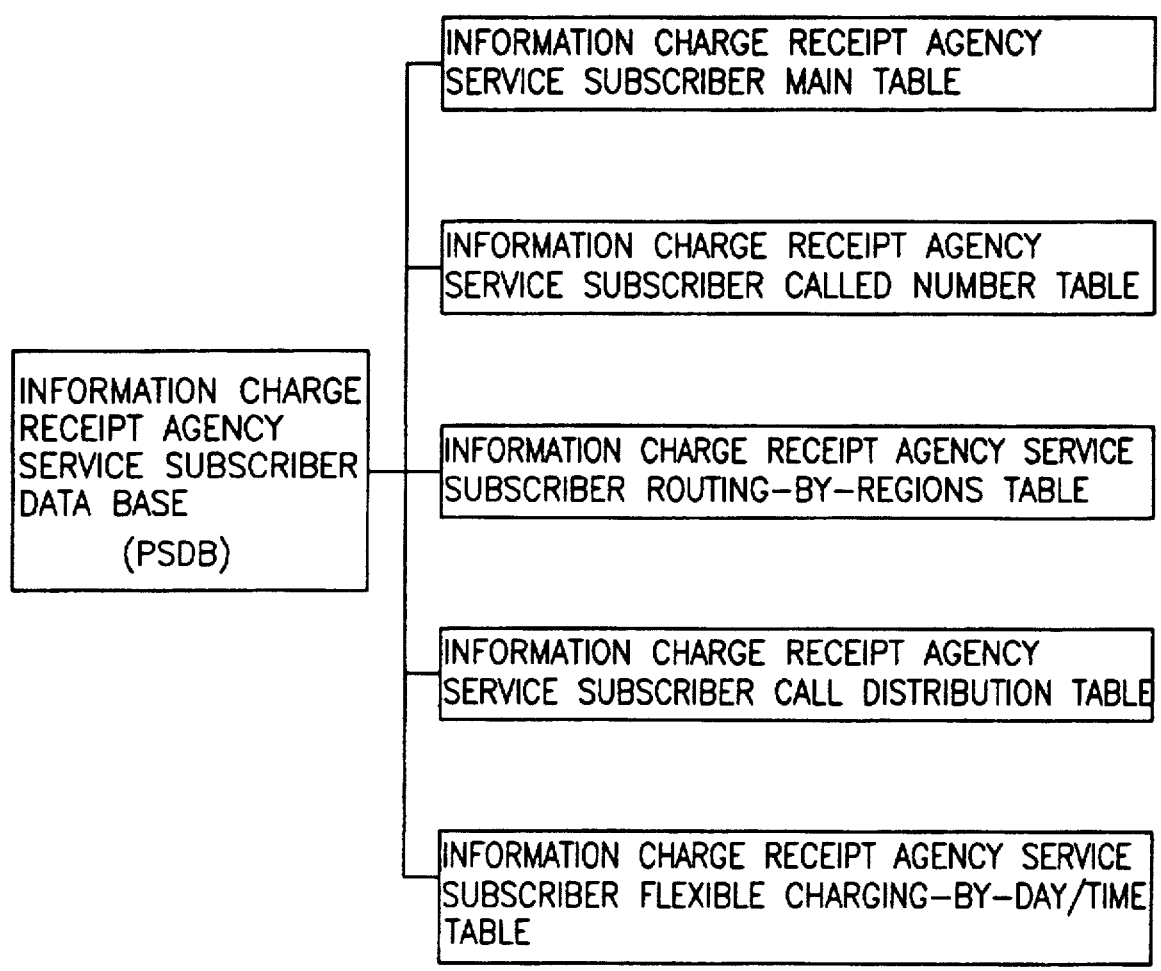
FIG. 2 is a view illustrating a structure of an Premium-rate service subscriber database which is applied to the present invention.

Referring to FIG. 2, there is shown a structure of the Premium-rate service subscriber database which is applied to the present invention.

The intelligent network service subscriber databases and the service operation databases applied to the present invention are real-time databases which are stored in a main memory.

As shown in FIG. 2, the Premium-rate service subscriber database is provided with an Premium-rate service subscriber main table, an Premium-rate service subscriber called number table, an Premium-rate service subscriber routing-by-regions table, an Premium-rate service subscriber call distribution table and an Premium-rate service subscriber flexible charging-by-day/time table.

The Premium-rate service subscriber main table and the Premium-rate service subscriber called number table are necessarily used by all the service subscribers. The Premium rate service subscriber routing-by-regions table, the Premium rate service subscriber call distribution table and the Premium-rate service subscriber flexible charging-by-day/time table are selectively used according to service features desired by the service subscribers.

Data items necessary to an origin dependent routing function are stored in the Premium-rate service subscriber routing-by-regions table. Data items necessary to a call distribution function are stored in the Premium-rate service subscriber call distribution table. Data items necessary to a flexible charging-by-day/time function are stored in the Premium-rate service subscriber flexible charging-by-day/time table.

Referring to FIG. 3, there is shown a format of the Premium-rate service subscriber main table which is applied to the present invention. As shown in this drawing, the Premium rate service subscriber main table includes a subscriber number data field pr__number, a service status/bill validation data field validation, a service feature data field svc__type and a total called line number data field num__of__lines.

Data in the subscriber number data field pr__number are used as index values of the Premium-rate service subscriber main table.

Data are stored and retrieved in the service status/bill validation data field validation, the service feature data field svc__type and the total called line number data field num__of__lines on the basis of the data in the subscriber number data field pr__number which are the index values of the Premium-rate service subscriber main table.

Subscriber numbers are assigned to subscribers to the Premium-rate service, respectively.

The service feature data field svc__type includes a service feature classification data field sf__class, a billing type data field bill__, a basic charging information data field charge information and a day/time classification data field fc__class.

The service function(feature) classification data field sf__class includes service function (feature) data such as flexible charging-by-day/time function(feature) data, call distribution function(feature) data and origin dependent routing function(feature) data, selected according to a service subscriber's intention.

The day/time classification data field fc__class is used only when the service subscriber subscribes to the flexible charging-by-day/time service function(feature). The day/time classification data field fc__class includes subscription data such as a specific time of day, a specific day of week, a specific of year and a holiday.

Referring to FIG. 4, there is shown a format of the Premium-rate service subscriber flexible charging-by-day/time table which is applied to the present invention. As shown in this drawing, the Premium-rate service subscriber flexible charging-by-day/time table includes a subscriber number data field pr__number, a day/time information data field time__info, a start/end time data field from__to and a charging rate data field charge__rate.

Data in the subscriber number data field pr__number and the day/time information data field time__info are used as index values of the Premium-rate service subscriber flexible charging-by-day/time table.

Data are stored and retrieved in the start/end time data field from__to and the charging rate data field charge__rate on the basis of the data in the subscriber number data field pr__number and day/time information data field time__info which are the index values of the Premium-rate service subscriber flexible charging-by-day/time table.

The day/time information data field time__info includes specific date data DOY (day of year), specific day data DOW (day of week), specific time data TOD (time of day) and legal holiday data SPD (special day) which are designated by the Premium-rate service subscriber subscribing to the flexible charging-by-day/time service function(feature) . The specific date data DOY, the specific day data DOW, the specific time data TOD and the holiday data SPD indicate the date, the day, the time and the holiday that the Premium-rate service subscriber subscribing to the flexible charging-by-day/time service feature is to change the charging rate, respectively.

The start/end time data field from__to includes data indicating designated start and end times of the date (day of year), the day (day of week), the time (time of day) and the holiday which the Premium-rate service subscriber subscribing to the flexible charging-by-day/time service function is to change the charging rate.

The charging rate data field charge__rate includes information charge discount rates which are percentages of information charge classes to the start and end times of the date (day of year), the day (day of week), the time (time of day) and the holiday which are designated by the Premium-rate service subscriber subscribing to the flexible charging-by day/time service feature.

Information charge class data are stored in the basic charging information data field charge__information in the Premium-rate service subscriber main table.

The charging rate data field charge__rate includes first and second charging rate data charge__rate1 and charge__rate2.

The first charging rate data charge__rate1 indicates an information charge discount rate which is a percentage of an information charge class to an interval between the start and end times of the date (day of year), the day (day of week), the time (time of day) and the holiday which are designated by the Premium-rate service subscriber subscribing to the flexible charging-by-day/time service function.

The second charging rate data charge_rate2 indicates an information charge discount rate which is a percentage of an information charge class to time other than the interval between the start and end times of the date, the day, the time and the holiday which are designated by the Premium-rate service subscriber subscribing to the flexible charging-byday/time service function.

The table 1 in FIG. 19 shows hours, minutes and seconds in 96 units. The 96 time values are used as the start and end time data in the start/end time data field from_to in the premium-rate service subscriber flexible charging-by-day/time table. As seen from the table 1, 24 hours are coded in the unit of 15 minutes to efficiently express one day. Namely, (24×60) minutes/15 minutes=96. Of course, new code values may be used to express one day in a shorter time unit. As mentioned above, the charging rate data field charge_rate includes the first and second charging rate data charge_rate1 and charge_rate2 indicating the information charge discount rates which are percentages of information charge classes to the start and end times of the date, the day, the time and the holiday which are designated by the premium-rate service subscriber subscribing to the flexible charging-by-day/time service function.

Figure 5:
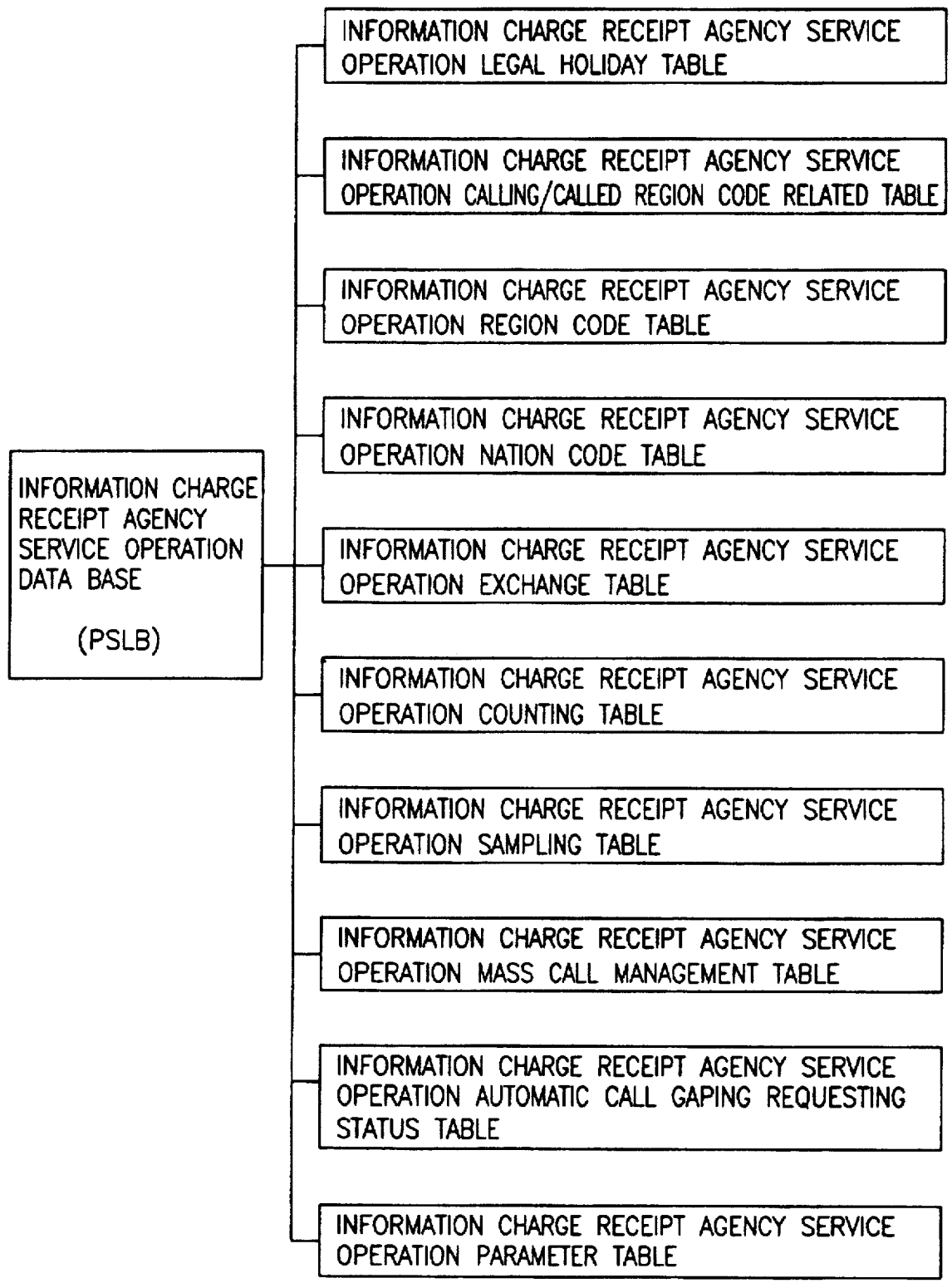
FIG. 5 is a view illustrating a structure of an Premium rate service operation database which is applied to the present invention.

Referring to FIG. 5, there is shown a structure of the premium-rate service operation database which is applied to the present invention. As shown in this drawing, the premium rate service operation database includes a premium-rate service operation holiday table, a premium-rate service operation calling/called region code related table, a premium rate service operation region code table, a premium-rate service operation nation code table, a premium-rate service operation service exchange table, a premium-rate service operation counting table, a premium-rate service operation sampling table, a premium-rate service operation mass call management table, a premium-rate service operation automatic call gaping requesting status table and a premium-rate service operation parameter table.

Figure 6:
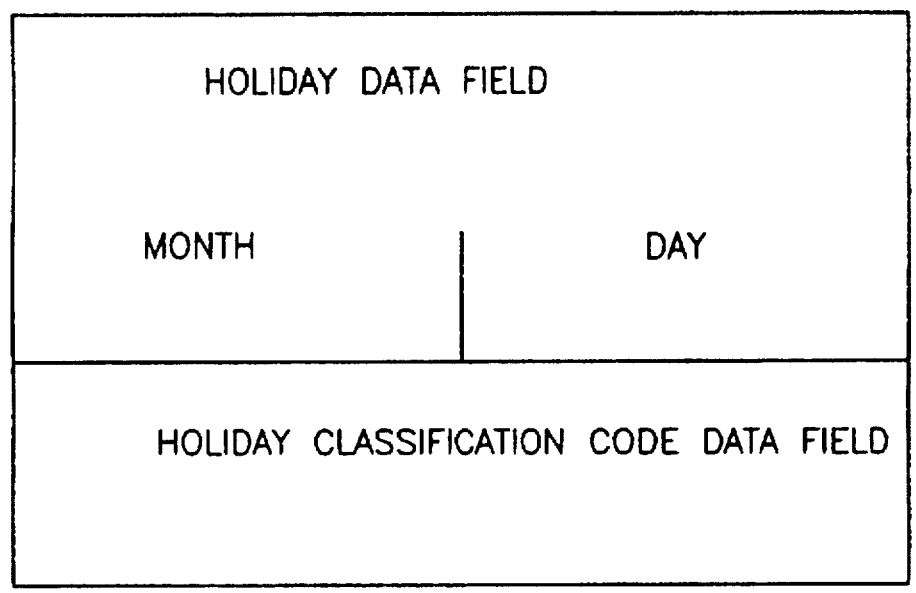
FIG. 6 is a view illustrating a format of an Premium-rate service operation holiday table which is applied to the present invention.

Referring to FIG. 6, there is shown a format of the premium-rate service operation holiday table which is applied to the present invention. As shown in this drawing, the premium-rate service operation holiday table includes a holiday data field and a holiday classification code data field. The holiday data field includes month and day data.

Figure 7:
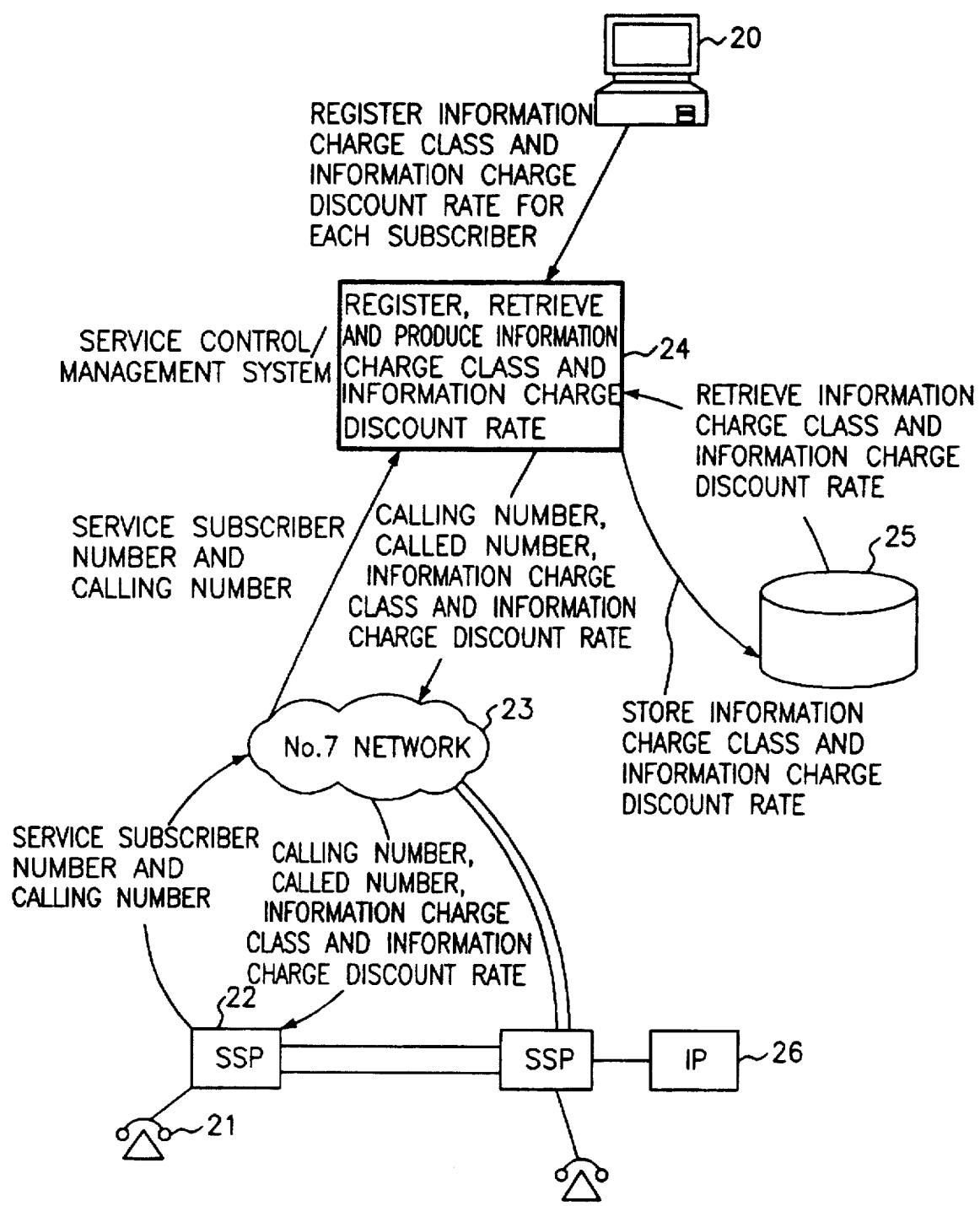
FIG. 7 is a drawing illustrating the operation of an Premium-rate service in an intelligent network in accordance with an embodiment of the present invention.

Referring to FIG. 7, there is shown a flowchart illustrating the operation of the premium-rate service in the intelligent network in accordance with an embodiment of the present invention.

In order to provide the premium-rate service in accordance with the present invention, data must be inputted, stored and registered in a service control/management system 24. Each subscriber designates information such as an information charge class, day/time, an information charge discount rate and a called number. The service control/management system 24 inputs the designated information from each subscriber through a terminal 20. The service control/management system 24 also inputs service common information such as holidays through the terminal 20. The service control/management system 24 then stores the inputted information into a database 25.

A service user dials a premium-rate service subscriber number using a telephone set 21 connected to a local switching point or service switching point (SSP) 22. The service switching point 22 inquires of the service control/management system 24 about a calling number of the service user and the service subscriber number through a common channel signalling network 23. The service control/management system 24 retrieves the database 25 according to the inquired service subscriber number and produces a called number, an information charge class and an information charge discount rate according to a predetermined processing routine. The service control/management system 24 then transmits the calling number and the produced called number, information charge class and information charge discount rate to the inquiring service switching point 22. Upon receiving the called number from the service control/management system 24, the service switching point 22 is connected to a service subscriber or information provider (IP) 26 to allow the service user to use information from the service subscriber 26.

Figure 8:
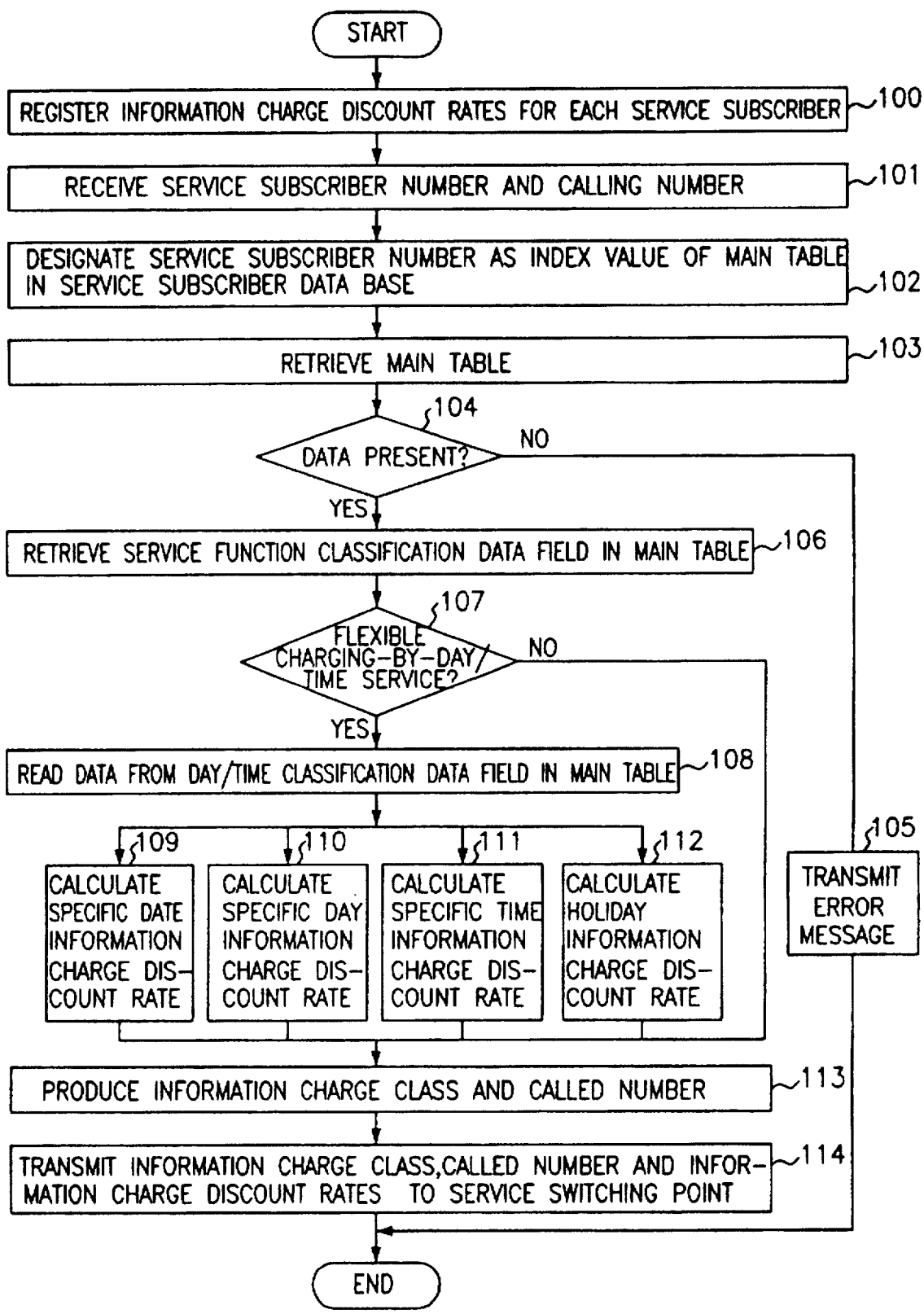
FIG. 8 is a flowchart illustrating a method of processing information charge discount rates for service subscribers in the formation charge receipt agency service in accordance with the embodiment of the present invention.

Referring to FIG. 8, there is shown a flowchart illustrating a method of processing information charge discount rates for service subscribers in the formation charge receipt agency service in accordance with the embodiment of the present invention.

First, at step 100, data necessary to the process of the information charge discount rates for each service subscriber are received through a terminal and stored in a service subscriber database. Then at step 100, each service subscriber is registered. When a service subscriber number and a calling number are received through a common channel signalling network at step 101, the received service subscriber number is designated as an index value of a main table in the service subscriber database at step 102. The main table is then retrieved at step 103 to check at step 104 whether data corresponding to the designated index value are present in the main table. If it is checked at step 104 that the data corresponding to the designated index value are not present in the main table, an error message is transmitted at step 105 and the operation is then ended. On the contrary, if it is checked at step 104 that the data corresponding to the designated index value are present in the main table, a service feature classification data field in the main table is retrieved at step 106 to check at step 107 whether the service subscriber has subscribed to a flexible charging-by-day/time service. If it is checked at step 107 that the service subscriber has not subscribed to the flexible charging-by-day/time service, an information charge class and a called number are produced at step 113. In this case, an information charge discount rate is determined as 0%. The produced information charge class and called number and the determined information charge discount rate are transmitted to a service switching point at step 114 and the operation is then ended. On the other hand, in the case where it is checked at step 107 that the service subscriber has subscribed to the flexible charging-by-day/time service, data are read from a day/time classification data field in the main table at step 108. A specific date information charge discount rate, a specific day information charge discount rate, a specific time information charge discount rate and a legal holiday information charge discount rate are calculated according to the read data from day/time classification data field at steps 109, 110, 111 and 112, respectively. Then, an information charge class and a called number are produced at step 113. The produced information charge class and called number and the calculated information charge discount rates are transmitted to the service switching point at step 114 and the operation is then ended.

Figure 9:
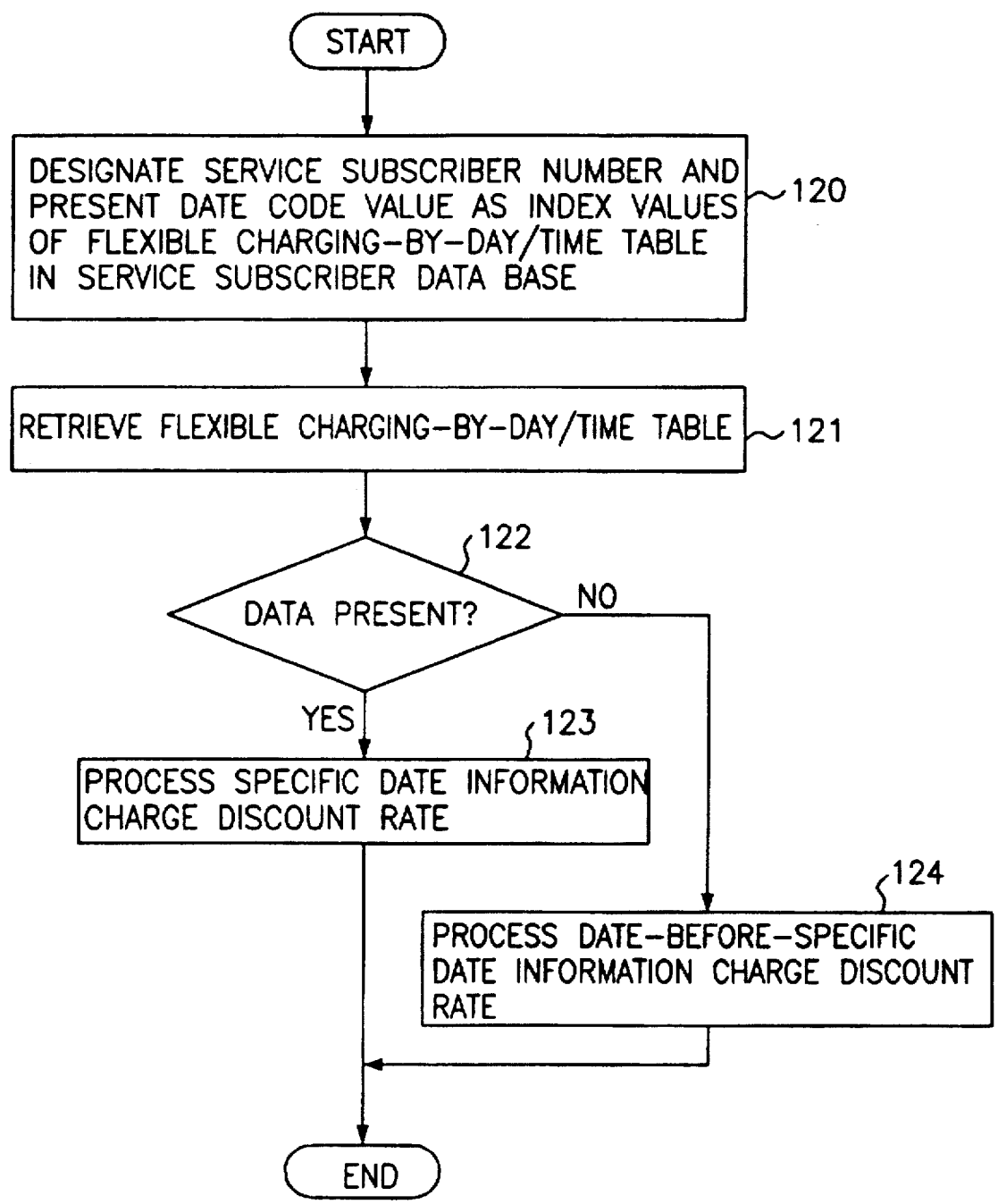
FIG. 9 is a flowchart illustrating the step of calculating a specific date information charge discount rate in the method of FIG. 8.

Referring to FIG. 9, there is shown a flowchart illustrating step 109 of calculating the specific date information charge discount rate in the method of FIG. 8.

First, the service subscriber number and a present (current) date code value are designated as index values of a flexible charging-by-day/time table in the service subscriber database at step 120. The flexible charging-by-day/time table is then retrieved at step 121 to check at step 122 whether data corresponding to the designated index values are present in the flexible charging-by-day/time table. If it is checked at step 122 that the data corresponding to the designated index values are present in the flexible chargingby-day/time table, the operation proceeds to step 123 of processing the specific date information charge discount rate and is then ended. On the contrary, if it is checked at step 122 that the data corresponding to the designated index values are not present in the flexible charging-by-day/time table, the operation proceeds to step 124 of processing a date-before-specific data information charge discount rate and is then ended. The present date code value is used as one of the index values of the flexible charging-by-day/time table. The present date code value indicates the month and the day that a calling subscriber or a service user requires the information charge receipt agency service. The present date code value is used to check whether it is the same as a specific date designated by the premium-rate service subscriber or information provider, which is one of the data in the day/time information data field in the flexible charging-by-day/time table in FIG. 4. The present date code value is expressed in two month digits and two day digits.

Figure 10:
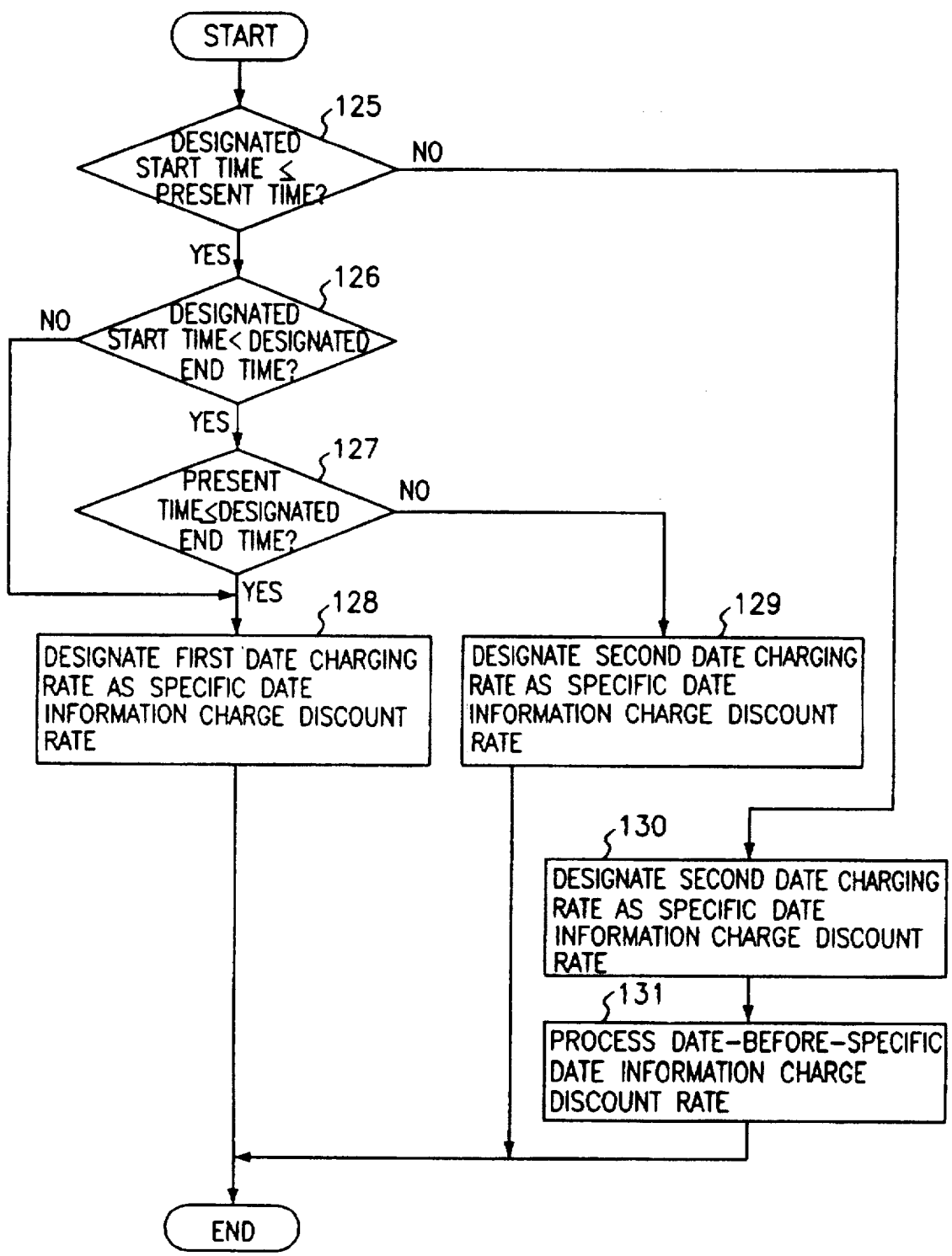
FIG. 10 is a flowchart illustrating the step of processing the specific date information charge discount rate in the step of FIG. 9.

Referring to FIG. 10, there is shown a flowchart illustrating step 123 of processing the specific date information charge discount rate in the step of FIG. 9.

First, it is checked at step 125 whether a designated start time is smaller than or equal to the present(current) time. If it is checked at step 125 that the designated start time is smaller than or equal to the present time, it is checked at step 126 whether the designated start time is smaller than a designated end time. If it is checked at step 126 that the designated start time is smaller than the designated end time, it is checked at step 127 whether the present time is smaller than or equal to the designated end time. On the contrary, if it is checked at step 126 that the designated start time is greater than or equal to the designated end time, a first charging rate is designated as the specific date information charge discount rate at step 128 and the operation is then ended. On the other hand, if it is checked at step 125 that the designated start time is greater than the present time, a second charging rate is designated as the specific date information charge discount rate at step 130, and the operation proceeds to step 131 of processing the date-before-specific date information charge discount rate and is then ended. In the case where it is checked at step 127 that the present time is smaller than or equal to the designated end time, the first charging rate is designated as the specific date information charge discount rate at step 128 and the operation is then ended. On the contrary, if it is checked at step 127 that the present time is greater than the designated end time, the second charging rate is designated as the specific date information charge discount rate at step 129 and the operation is then ended.

Figure 11:
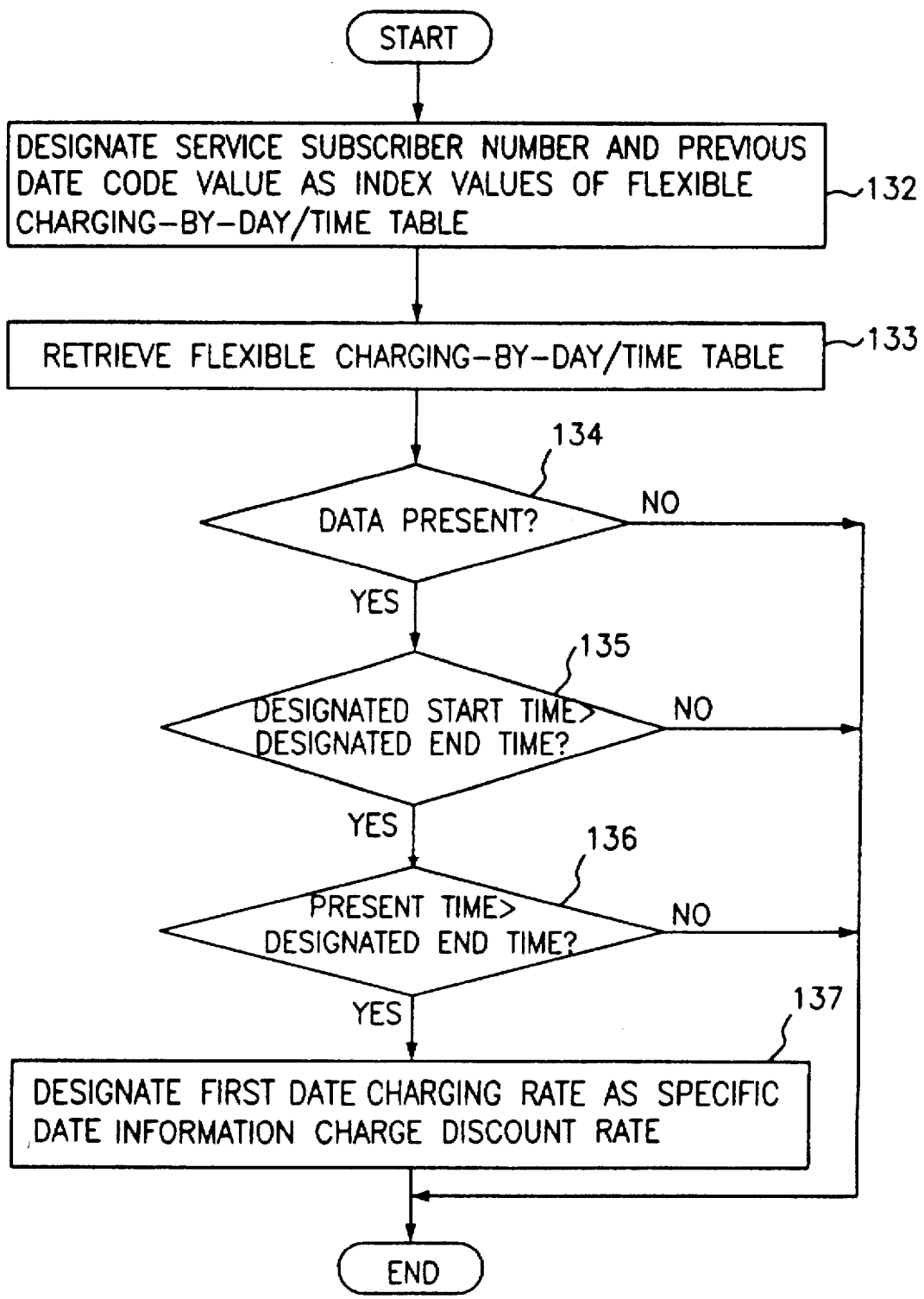
FIG. 11 is a flowchart illustrating the step of processing a date-before-specific date information charge discount rate in the step of FIG. 9 or the step of FIG. 10.

Referring to FIG. 11, there is shown a flowchart illustrating step 124 or step 131 of processing the date-before-specific date information charge discount rate in the step of FIG. 9 or the step of FIG. 10.

First, the service subscriber number and a previous date code value are designated as index values of the flexible charging-by-day/time table at step 132. The flexible charging-by-day/time table is then retrieved at step 133 to check at step 134 whether data corresponding to the designated index values are present in the flexible charging-by-day/time table. If it is checked at step 134 that the data corresponding to the designated index values are not present in the flexible charging-by-day/time table, the operation is ended. On the contrary, if it is checked at step 134 that the data corresponding to the designated index values are present in the flexible charging-by-day/time table, it is checked at step 135 whether the designated start time is greater than the designated end time. If it is checked at step 135 that the designated start time is greater than the designated end time, it is checked at step 136 whether the present time is greater than the designated end time. If it is checked at step 136 that the present time is greater than the designated end time, the first charging rate is designated as the specific date information charge discount rate at step 137 and the operation is then ended. On the other hand, in the case where it is checked at step 135 that the designated start time is smaller than or equal to the designated end time or in the case where it is checked at step 136 that the present time is smaller than or equal to the designated end time, the operation is ended.

Figure 12:
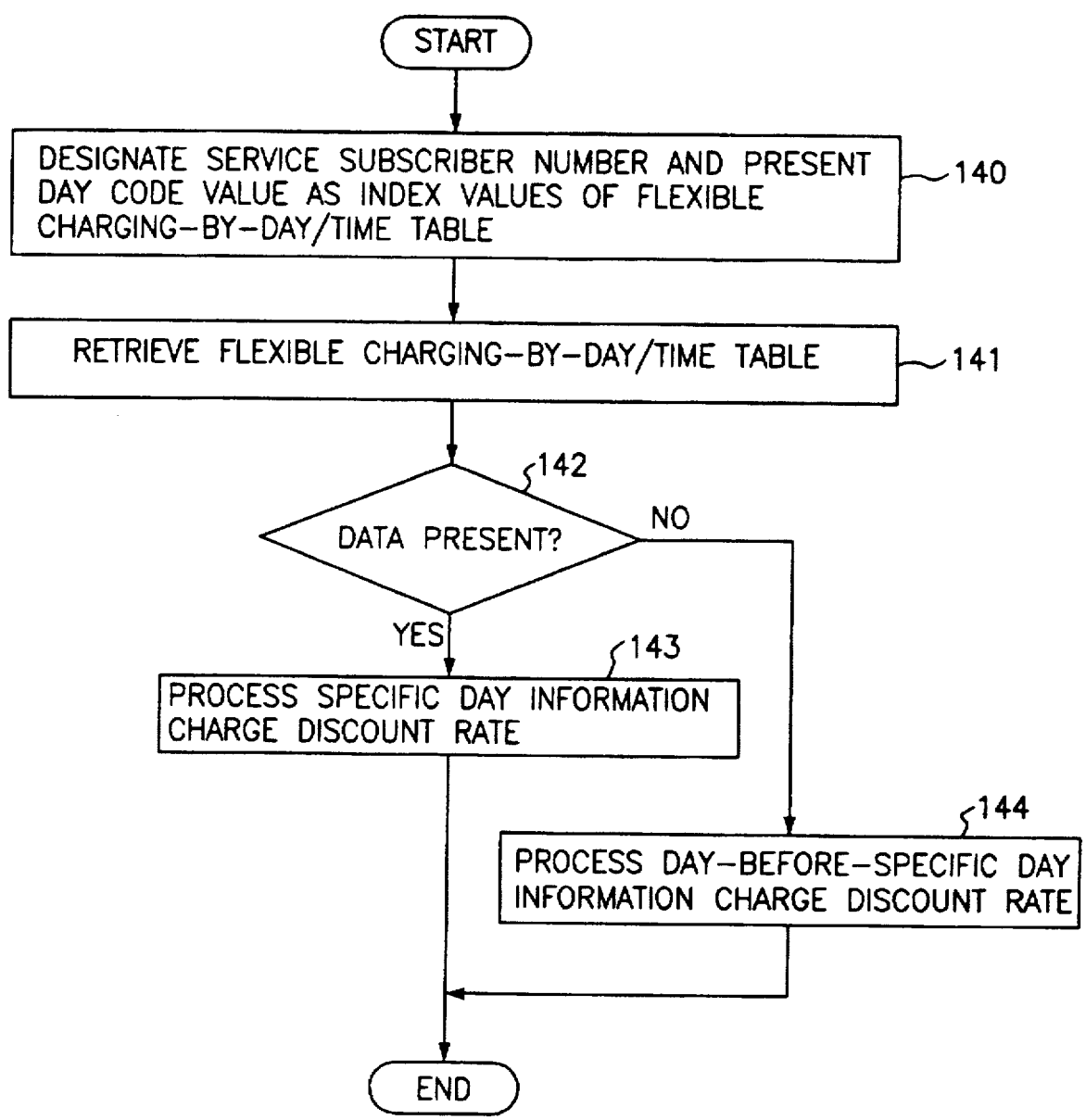
FIG. 12 is a flowchart illustrating the step of calculating a specific day information charge discount rate in the method of FIG. 8.

Referring to FIG. 12, there is shown a flowchart illustrating step 110 of calculating the specific day information charge discount rate in the method of FIG. 8.

First, the service subscriber number and a present day code value are designated as index values of the flexible charging-by-day/time table at step 140. The flexible charging-by-day/time table is then retrieved at step 141 to check at step 142 whether data corresponding to the designated index values are present in the flexible charging-by-day/time table. If it is checked at step 142 that the data corresponding to the designated index values are present in the flexible charging-by-day/time table, the operation proceeds to step 143 of processing the specific day information charge discount rate and is then ended. On the contrary, if it is checked at step 142 that the data corresponding to the designated index values are not present in the flexible charging-by-day/time table, the operation proceeds to step 144 of processing a day-before-specific day information charge discount rate and is then ended.

Figure 13:
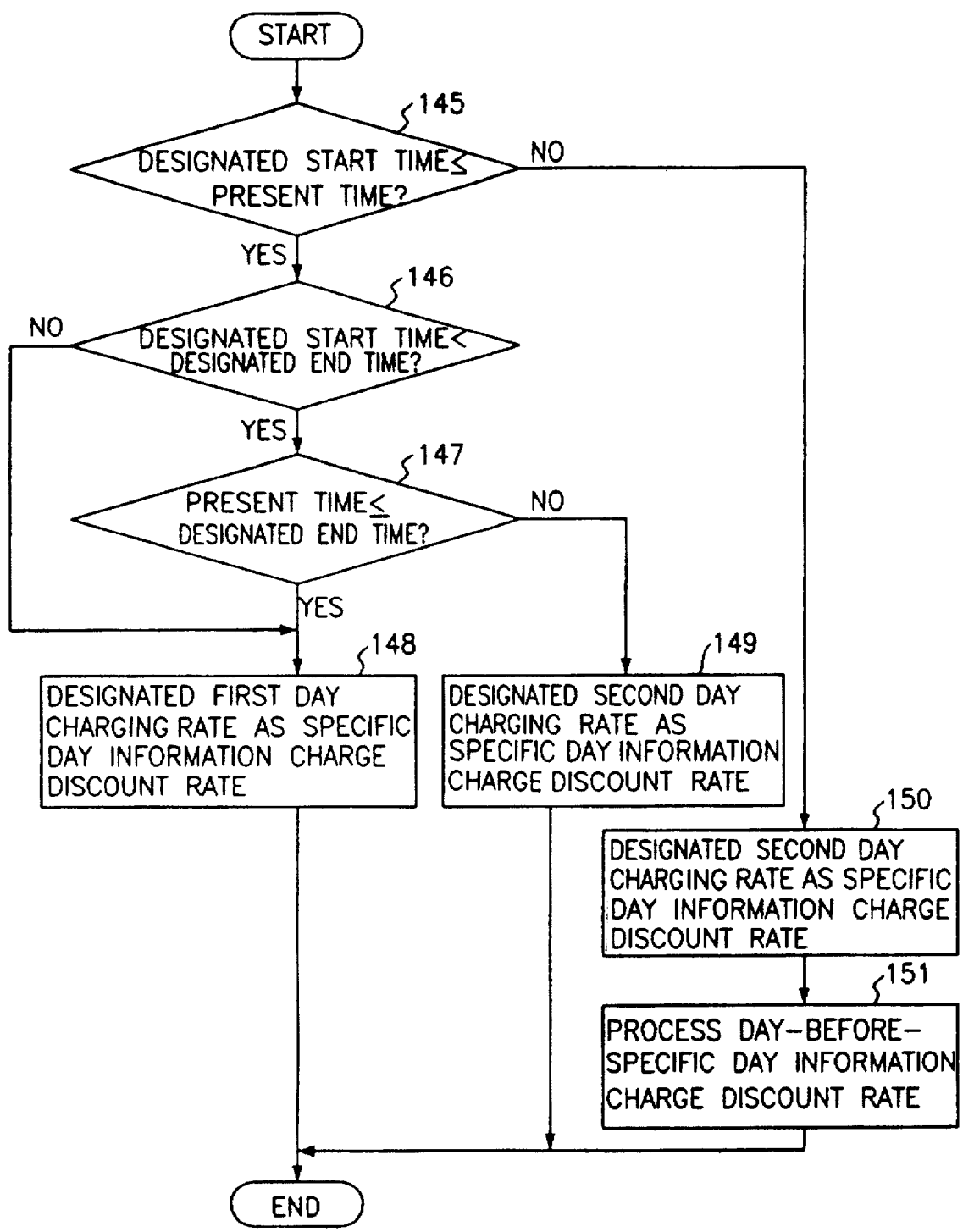
FIG. 13 is a flowchart illustrating the step of processing the specific day information charge discount rate in the step of FIG. 12.

Referring to FIG. 13, there is shown a flowchart illustrating step 143 of processing the specific day information charge discount rate in the step of FIG. 12.

First, it is checked at step 145 whether a designated start time is smaller than or equal to the present time. If it is checked at step 145 that the designated start time is smaller than or equal to the present time, it is checked at step 146 whether the designated start time is smaller than a designated end time. If it is checked at step 146 that the designated start time is smaller than the designated end time, it is checked at step 147 whether the present time is smaller than or equal to the designated end time. On the contrary, if it is checked at step 146 that the designated start time is greater than or equal to the designated end time, a first charging rate is designated as the specific day information charge discount rate at step 148 and the operation is then ended. On the other hand, if it is checked at step 145 that the designated start time is greater than the present time, a second charging rate is designated as the specific day information charge discount rate at step 150, and the operation proceeds to step 151 of processing the day-before-specific day information charge discount rate and is then ended. In the case where it is checked at step 147 that the present time is smaller than or equal to the designated end time, the first charging rate is designated as the specific day information charge discount rate at step 148 and the operation is then ended. On the contrary, if it is checked at step 147 that the present time is greater than the designated end time, the second charging rate is designated as the specific day information charge discount rate at step 149 and the operation is then ended.

Figure 14:
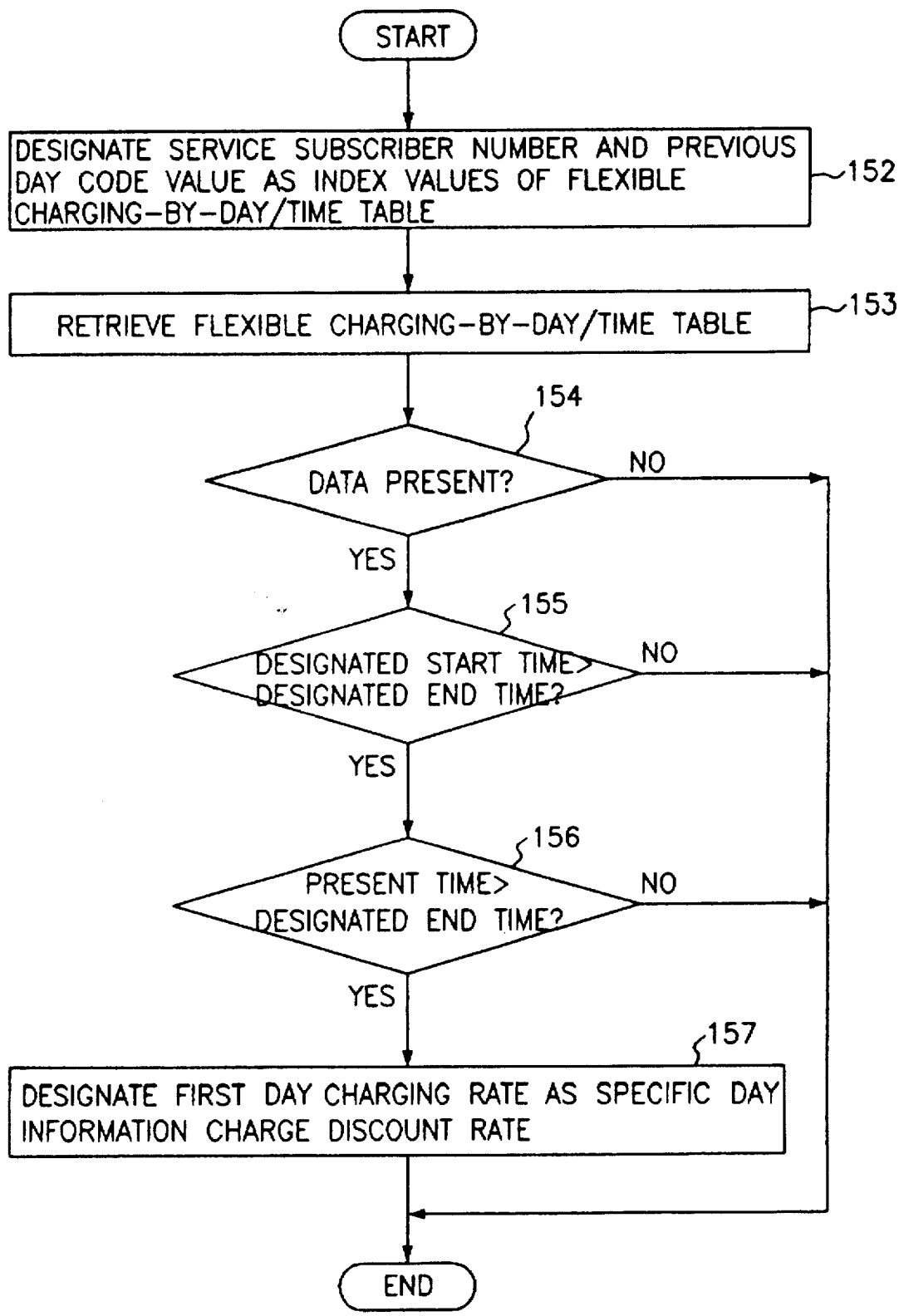
FIG. 14 is a flowchart illustrating the step of processing a day-before-specific day information charge discount rate in the step of FIG. 12 or the step of FIG. 13.

Referring to FIG. 14, there is shown a flowchart illustrating step 144 or step 151 of processing the day-before-specific day information charge discount rate in the step of FIG. 12 or the step of FIG. 13.

First, the service subscriber number and a previous day code value are designated as index values of the flexible charging-by-day/time table at step 152. The flexible charging-by-day/time table is then retrieved at step 153 to check at step 154 whether data corresponding to the designated index values are present in the flexible charging-by-day/time table. If it is checked at step 154 that the data corresponding to the designated index values are not present in the flexible charging-by-day/time table, the operation is ended. On the contrary, if it is checked at step 154 that the data corresponding to the designated index values are present in the flexible charging-by-day/time table, it is checked at step 155 whether the designated start time is greater than the designated end time. If it is checked at step 155 that the designated start time is greater than the designated end time, it is checked at step 156 whether the present time is greater than the designated end time. If it is checked at step 156 that the present time is greater than the designated end time, the first charging rate is designated as the specific day information charge discount rate at step 157 and the operation is then ended. On the other hand, in the case where it is checked at step 155 that the designated start time is smaller than or equal to the designated end time or in the case where it is checked at step 156 that the present time is smaller than or equal to the designated end time, the operation is ended.

Figure 15A:
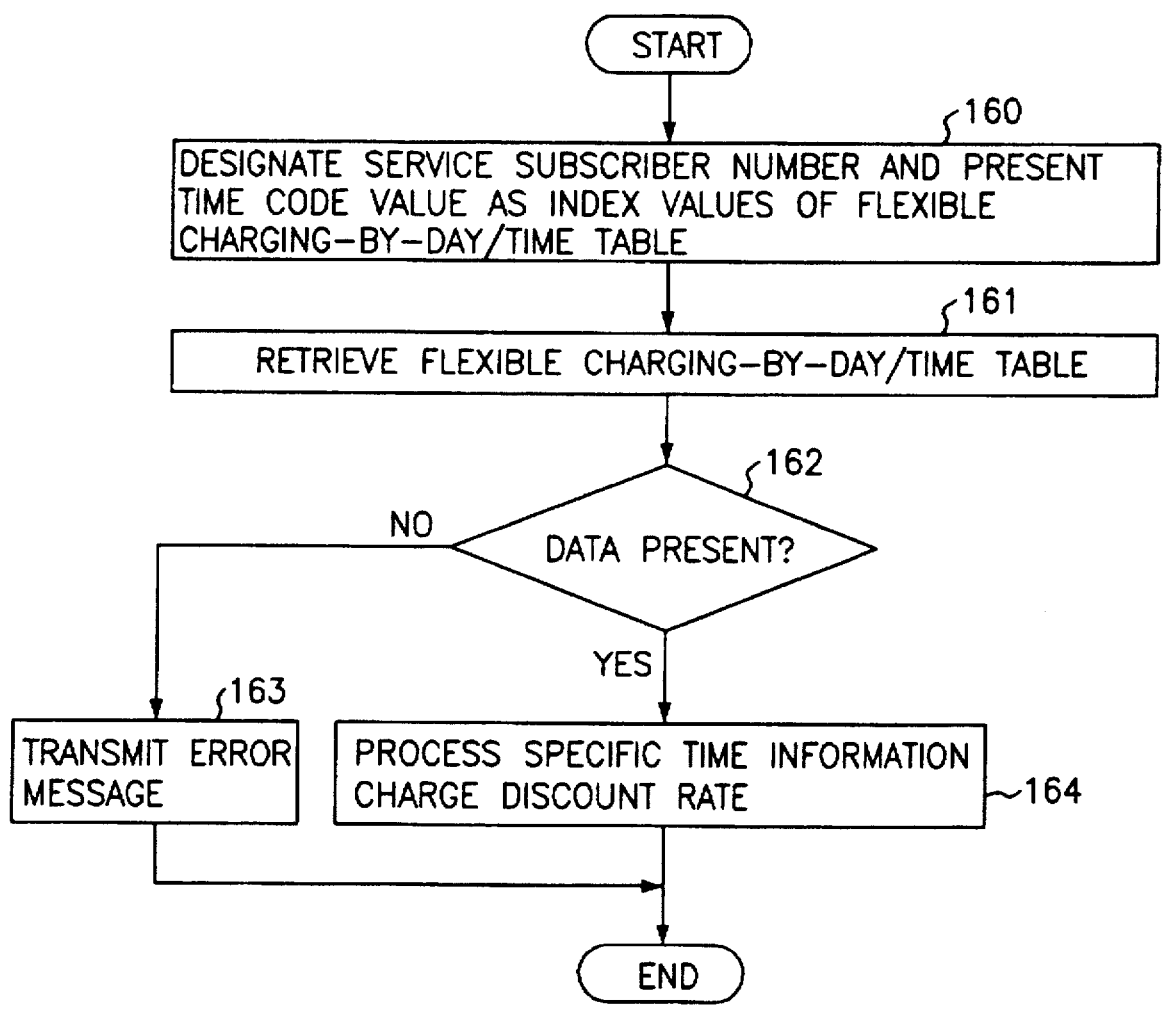
FIG. 15A is a flowchart illustrating the step of calculating a specific time information charge discount rate in the method of FIG. 8.

Referring to FIG. 15A, there is shown a flowchart illustrating step 111 of calculating the specific time information charge discount rate in the method of FIG. 8.

First, the service subscriber number and a present time code value are designated as index values of the flexible charging-by-day/time table at step 160. The flexible charging-by-day/time table is then retrieved at step 161 to check at step 162 whether data corresponding to the designated index values are present in the flexible charging-by-day/time table. If it is checked at step 162 that the data corresponding to the designated index values are not present in the flexible charging-by-day/time table, the error message is transmitted at step 163 and the operation is then ended. On the contrary, if it is checked at step 162 that the data corresponding to the designated index values are present in the flexible charging-by-day/time table, the operation proceeds to step 164 of processing the specific time information charge discount rate and is then ended.

Figure 15B:
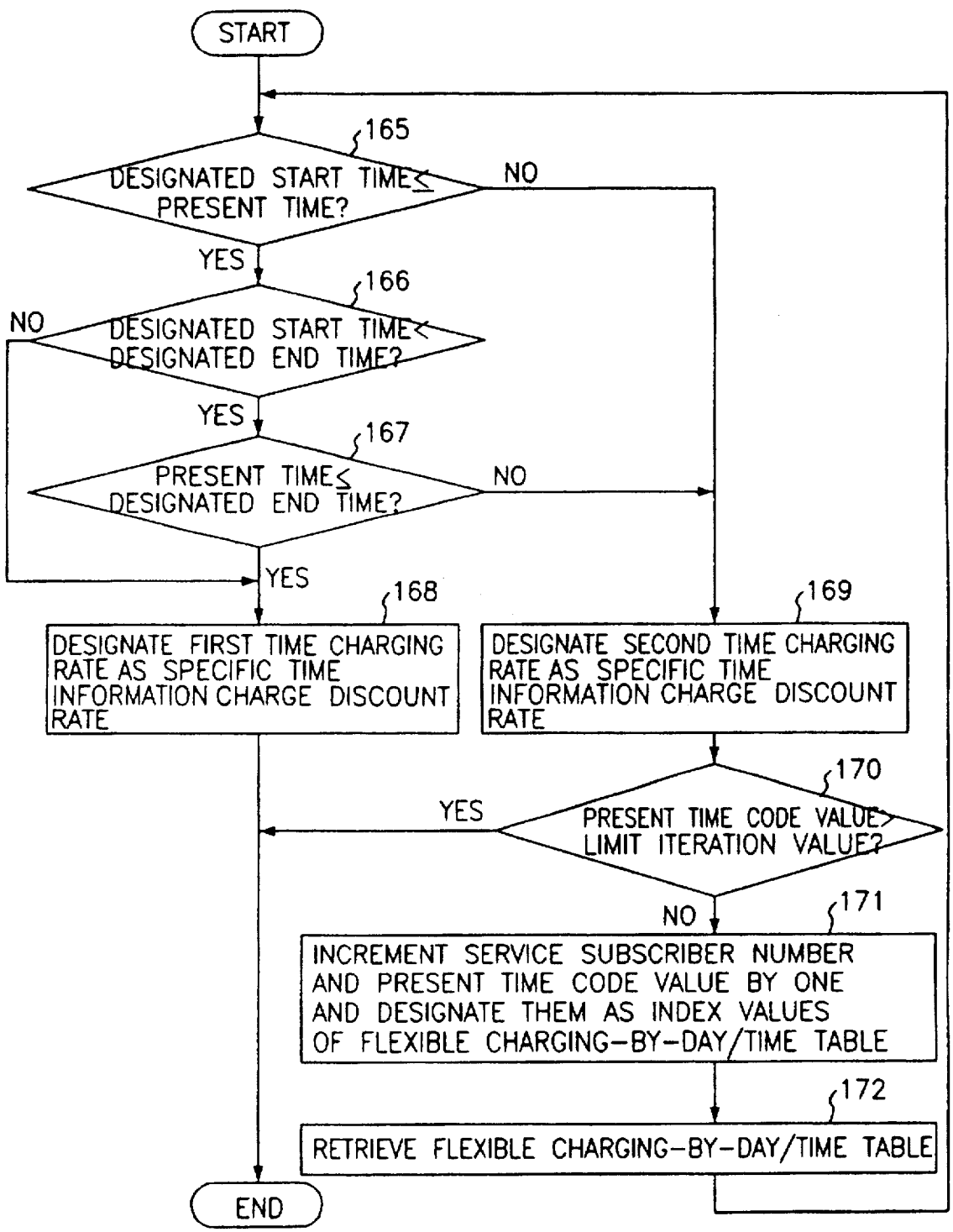
FIG. 15B is a flowchart illustrating the step of processing the specific time information charge discount rate in the step of FIG. 15A.

Referring to FIG. 15B, there is shown a flowchart illustrating step 164 of processing the specific time information charge discount rate in the step of FIG. 15A.

First, it is checked at step 165 whether a designated start time is smaller than or equal to the present time. If it is checked at step 165 that the designated start time is smaller than or equal to the present time, it is checked at step 166 whether the designated start time is smaller than a designated end time. If it is checked at step 166 that the designated start time is smaller than the designated end time, it is checked at step 167 whether the present time is smaller than or equal to the designated end time. On the contrary, if it is checked at step 166 that the designated start time is greater than or equal to the designated end time, a first charging rate is designated as the specific time information charge discount rate at step 168 and the operation is then ended. On the other hand, if it is checked at step 165 that the designated start time is greater than the present time, a second charging rate is designated as the specific time information charge discount rate at step 169, and it is checked at step 170 whether the present time code value has exceeded a limit iteration value. If it is checked at step 170 that the present time code value has exceeded the limit iteration value, the operation is ended. On the contrary, in the case where it is checked at step 170 that the present time code value has not exceeded the limit iteration value, the service subscriber number and the present time code value are incremented by one, respectively, and then designated as index values of the flexible charging-by-day/time table at step 171. Then, the flexible charging-by-day/time table is retrieved at step 172 and the operation returns to step 105 to repeat the above steps. On the other hand, in the case where it is checked at step 167 that the present time is smaller than or equal to the designated end time, the first charging rate is designated as the specific time information charge discount rate at step 168 and the operation is then ended. On the contrary, if it is checked at step 167 that the present time is greater than the designated end time, the second charging rate is designated as the specific time information charge discount rate at step 169 and the operation then proceeds to step 170 of checking whether the present time code value has exceeded the limit iteration value.

Figure 16:
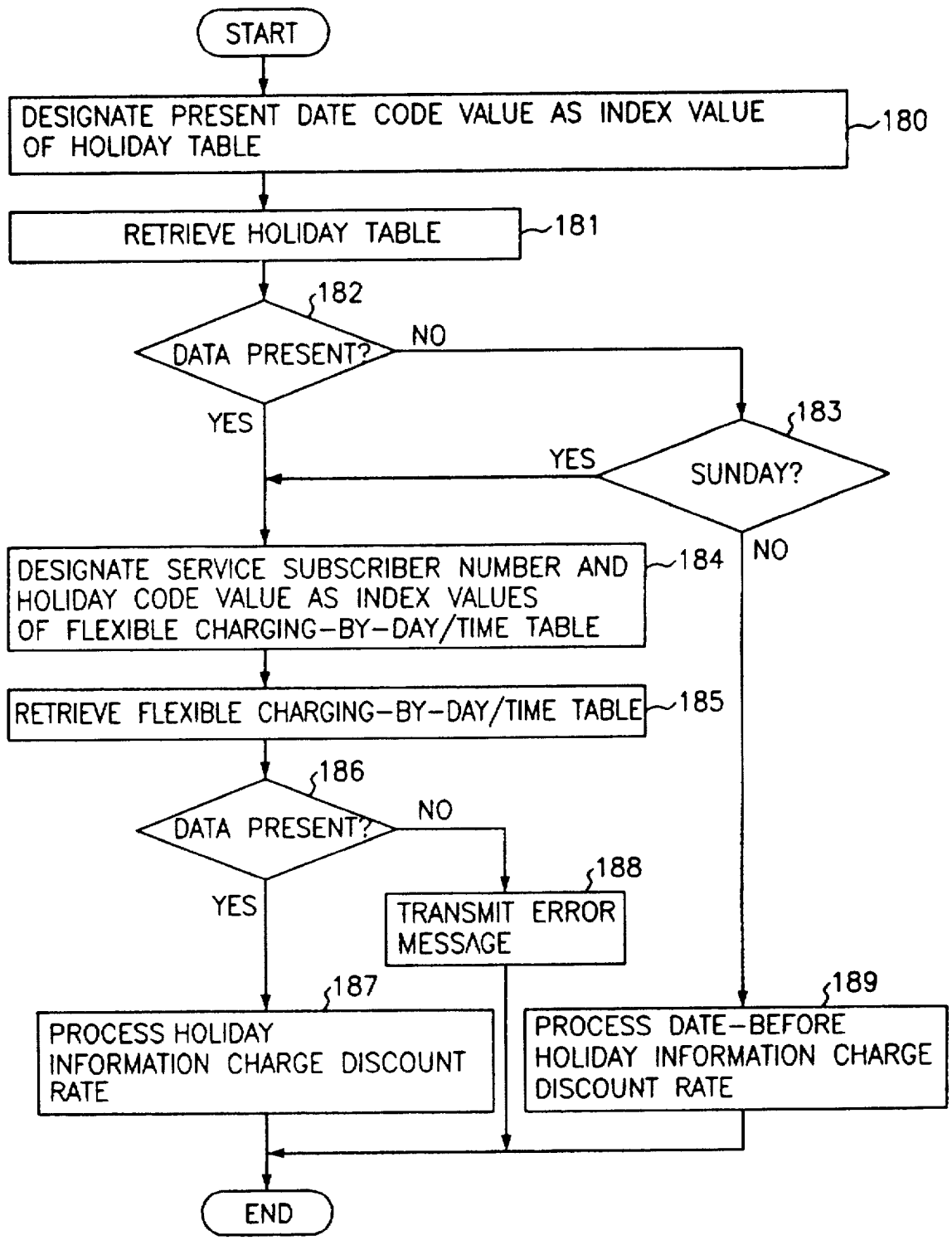
FIG. 16 is a flowchart illustrating the step of calculating a holiday information charge discount rate in the method of FIG. 8.

Referring to FIG. 16, there is shown a flowchart illustrating step 112 of calculating the holiday information charge discount rate in the method of FIG. 8.

First, a present date code value is designated as an index value of a holiday table in the premium-rate service operation database at step 180. The holiday table is retrieved at step 181 to check at step 182 whether data corresponding to the designated index value are present in the holiday table. If it is checked at step 182 that the data corresponding to the designated index value are not present in the holiday table, it is checked at step 183 whether the present day is Sunday. If it is checked at step 183 that the present day is not Sunday, the operation proceeds to step 189 of processing a date-before-holiday information charge discount rate and is then ended.

In the case where it is checked at step 182 that the data corresponding to the designated index value are present in the holiday table or in the case where it is checked at step 183 that the present day is Sunday, the service subscriber number and a holiday code value are designated as index values of the flexible charging-by-day/time table at step 184.

The flexible charging-by-day/time table is retrieved at step 185 to check at step 186 whether data corresponding to the designated index values are present in the flexible charging-by-day/time table.

If it is checked at step 186 that the data corresponding to the designated index values are not present in the flexible charging-by-day/time table, the error message is transmitted at step 188 and the operation is then ended. On the contrary, if it is checked at step 186 that the data corresponding to the designated index values are present in the flexible charging-by-day/time table, the operation proceeds to step 187 of processing the holiday information charge discount rate and is then ended.

The present date code value indicates the month and the day that the calling subscriber requires the premium-rate service.

The present date code value is expressed in two month digits and two day digits. For example, the present date code value of 0101 indicates January 1, the present date code value of 0329 indicates March 29, the present date code value of 0701 indicates July 1, the present date code value of 1105 indicates November 5 and the present date code value of 1231 indicates December 31. Namely, the present date code value may any one of values from 0101 to 1231.

The holiday table has the maximum 366 records. In the case where the premium-rate service subscribers are 30,000 in number, the flexible charging-by-day/time table has the maximum 540,000 records. That is, 540,000 records=30,000 (premium-rate service subscribers)×|7 (specific dates)+7 (specific days)+3 (specific time zones)+1 (holiday)|records. Time required in reading the 366 records in the holiday table is longer than that required in reading the 540,000 records in the flexible charging-by-day/time table. The premium-rate service must be processed in real-time. For this reason, the table reading operation as one of the service processing operations must be processed in more real-time for the real-time process of the premium-rate service.

In this connection, in processing the holiday information charge discount rate, the holiday table is first retrieved and the flexible charging-by-day/time table is then retrieved only in the case where data are present in the holiday table. In other words, in the case where no data is present in the holiday table, the operation is ended without retrieving the flexible charging-by-day/time table. Therefore, an unnecessary processing time can be reduced.

Figure 17:
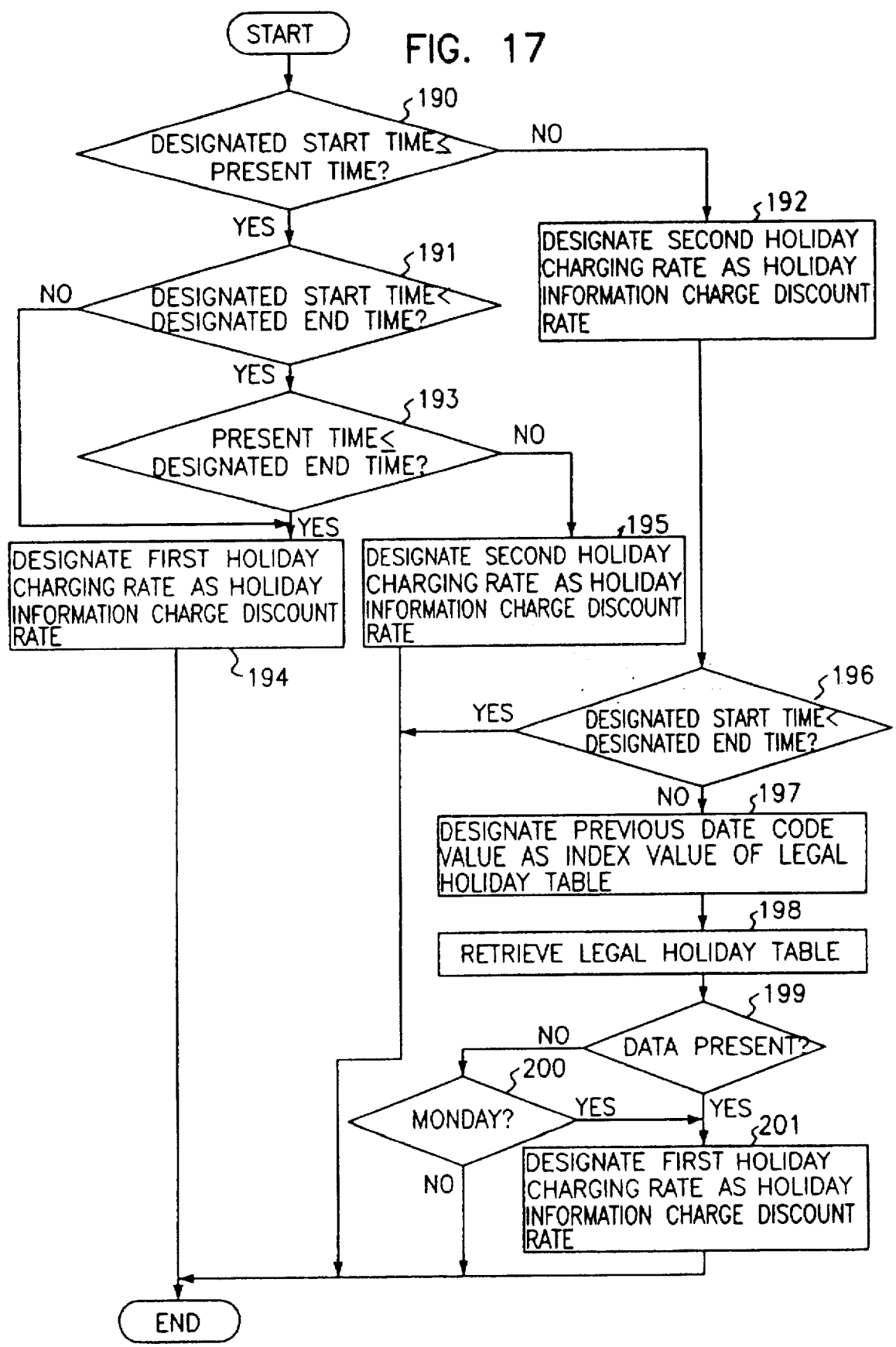
FIG. 17 is a flowchart illustrating the step of processing the holiday information charge discount rate in the step of FIG. 16.

Referring to FIG. 17, there is shown a flowchart illustrating step 187 of processing the holiday information charge discount rate in the step of FIG. 16.

First, it is checked at step 190 whether a designated start time is smaller than or equal to the present time. If it is checked at step 190 that the designated start time is smaller than or equal to the present time, it is checked at step 191 whether the designated start time is smaller than a designated end time. If it is checked at step 191 that the designated start time is smaller than the designated end time, it is checked at step 193 whether the present time is smaller than or equal to the designated end time. In the case where it is checked at step 193 that the present time is smaller than or equal to the designated end time, a first charging rate is designated as the holiday information charge discount rate at step 194 and the operation is then ended.

On the contrary, if it is checked at step 193 that the present time is greater than the designated end time, a second charging rate is designated as the holiday information charge discount rate at step 195 and the operation is then ended.

In the case where it is checked at step 191 that the designated start time is not smaller than the designated end time, the first charging rate is designated as the holiday information charge discount rate at step 194 and the operation is then ended.

On the other hand, if it is checked at step 190 that the designated start time is greater than the present time, the second charging rate is designated as the holiday information charge discount rate at step 192, and it is checked at step 196 whether the designated start time is smaller than the designated end time. Noticeably, the second charging rate is applied to the case where the present day is a holiday but the present time is not within a designated time zone of the holiday. The first charging rate is applied to the case where the previous day is a holiday but the present time belongs to a designated time zone of the holiday.

If it is checked at step 196 that the designated start time is smaller than the designated end time, the operation is ended. On the contrary, if it is checked at step 196 that the designated start time is not smaller than the designated end time, a previous date code value is designated as an index value of the holiday table at step 197. The holiday table is then retrieved at step 198 to check at step 199 whether data corresponding to the designated index value are present in the holiday table. If it is checked at step 199 that the data corresponding to the designated index value are present in the holiday table, the first charging rate is designated as the holiday information charge discount rate at step 201 and the operation is then ended.

In the case where it is checked at step 199 that the data corresponding to the designated index value are not present in the holiday table, it is checked at step 200 whether the present day is Monday. If it is checked at step 200 that the present day is not Monday, the operation is ended. On the contrary, if it is checked at step 200 that the present day is Monday, the first charging rate is designated as the holiday information charge discount rate at step 201 and the operation is then ended.

Figure 18:
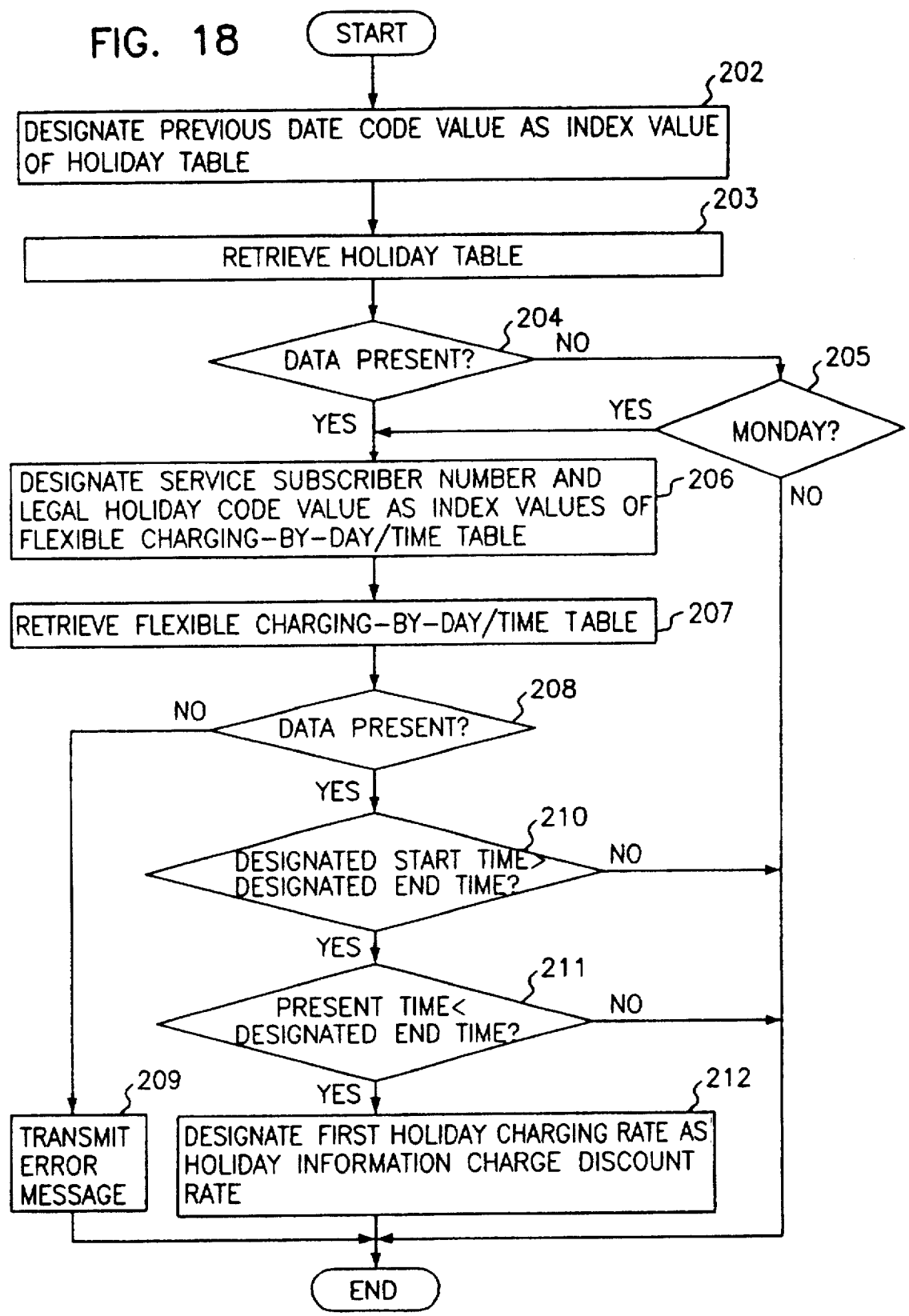
FIG. 18 is a flowchart illustrating the step of processing a date-before-holiday information charge discount rate in the step of FIG. 16.

Referring to FIG. 18, there is shown a flowchart illustrating step 189 of processing the date-before-holiday information charge discount rate in the step of FIG. 16.

First, a previous date code value is designated as an index value of the legal holiday table at step 202. The holiday table is then retrieved at step 203 to check at step 204 whether data corresponding to the designated index value are present in the holiday table.

If it is checked at step 204 that the data corresponding to the designated index value are not present in the holiday table, it is checked at step 205 whether the present day is Monday. If it is checked at step 205 that the present day is not Monday, the operation is ended. On the contrary, if it is checked at step 204 that the data corresponding to the designated index value are present in the holiday table or if it is checked at step 205 that the present day is Monday, the service subscriber number and the holiday code value are designated as index values of the flexible charging-by-day/time table at step 206.

The flexible charging-by-day/time table is then retrieved at step 207 to check at step 208 whether data corresponding to the designated index values are present in the flexible charging-by-day/time table.

If it is checked at step 208 that the data corresponding to the designated index values are not present in the flexible charging-by-day/time table, the error message is transmitted at step 209 and the operation is then ended. On the contrary, if it is checked at step 200 that the data corresponding to the designated index values are present in the flexible charging-by-day/time table, it is checked at step 210 whether the designated start time is greater than the designated end time.

In the case where it is checked at step 210 that the designated start time is not greater than the designated end time, the operation is ended. On the contrary, if it is checked at step 210 that the designated start time is greater than the designated end time, it is checked at step 211 whether the present time is smaller than the designated end time.

If it is checked at step 211 that the present time is not smaller than the designated end time, the operation is ended. On the contrary, if it is checked at step 211 that the present time is smaller than the designated end time, the first charging rate is designated as the holiday information charge discount rate at step 212 and the operation is then ended.

As apparent from the above description, according to the present invention, each service subscriber can designate desired information charge discount rates for a specific time, a specific day, a specific date and a holiday to apply the designated information charge discount rates to service users. Also, each service subscriber can designate two time zones a day at the maximum as compared with the conventional art in which the service subscribers have no choice but to designate only one time zone a day because of the database index characteristic. The designated values can be processed from the designated start time of the present day to the designated end time of the following day, thereby overcoming conventional limitations that the designated values cannot help being processed from 00:00 to 24:00 on the present day due to the database characteristic. Further, the information charge discount rate can be designated for all desired time zones of the legal holiday, which cannot be accomplished by the conventional technique because of the database characteristic and the database index characteristic. The present invention can be applied to the premium-rate service in the intelligent network in such a manner that the service subscribers (information providers) can provide specific discount rates for the information users on desired days or at desired time zones. Therefore, the present invention has the effect of allowing information users to use the information from the service subscribers at low price.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of processing information charge discount rates for service subscribers in a premium-rate service, said premium-rate service being applied to an intelligent network service control/management system, comprising the steps of:
   (100) storing information charge discount rate data for each service subscriber;
   (101) receiving a service subscriber number and a calling number;
   (102) designating the received service subscriber number as an index to a main table in a service subscriber database;
   (104) if data corresponding to the designated index is present in the main table in the service subscriber database, the further steps of:
   (107) if the service subscriber has subscribed to a flexible charging-by-day/time service, the further steps of:
   (108) reading data from a day/time classification data field in the main table; and
   (109) calculating a specific date information charge discount rate, (110) a specific day information charge discount rate, (111) a specific time information charge discount rate and (112) a holiday information charge discount rate according to the read data from the day/time classification data field;
   (107) otherwise, the further step of:
   calculating the specific date information charge discount rate to be 0%;
   (113) producing an information charge class and a called number; and
   (114) transmitting the calculated information charge discount rate, the produced information charge class, and the called number to a service switching point;
   (104) otherwise, the further step of:
   (105) transmitting an error message.

2. A method as set forth in claim 1, wherein said step (109) of calculating the specific date information charge discount rate includes the steps of:
   (120) designating the received service subscriber number and a present date code value as indexes to a flexible charging-by-day/time table in the service subscriber database;
   (122) if data corresponding to the designated indexes is present in the flexible charging-by-day/time table, the further step of:
   (123) processing a present-date specific date information charge discount rate;
   (122) otherwise, the further step of:
   (124) processing a date-before-specific date information charge discount rate.

3. A method, as set forth in claim 2, wherein said step (123) of processing the present-date specific date information charge discount rate includes the steps of:
   (125) if a designated start time is less than or equal to the present time, the further steps of:
   (126, 127) if the designated start time is less than a designated end time and the present time is greater than the designated end time, the further step of:
   (129) designating a second date charging rate as the specific date information charge discount rate;
   (126, 127) otherwise, the further step of:
   (128) designating a first date charging rate as the specific date information charge discount rate;
   (125) otherwise, the further steps of:
   (130) designating the second date charging rate as the specific date information charge discount rate; and
   (131) processing the date-before-specific date information charge discount rate.

4. A method, as set forth in claim 2 or claim 3, wherein said step (124) of processing the date-before-specific date information charge discount rate includes the steps of:
   (132) designating the service subscriber number and a previous date code value as indexes to the flexible charging-by-day/time table in the service subscriber database; and
   (134) if data corresponding to the designated indexes is present in the flexible charging-by-day/time table, and
   (135) if the designated start time is greater than the designated end time, and
   (136) if the present time is greater than the designated end time, the further step of:
   (137) designating the first date charging rate as the specific date information charge discount rate.

5. A method, as set forth in claim 1, wherein said step (110) of calculating the specific day information charge discount rate includes the steps of:
   (140) designating the service subscriber number and a present day code value as indexes to a flexible charging-by-day/time table in the service subscriber database;
   (142) if data corresponding to the designated indexes is present in the flexible charging-by-day/time table, the further step of:
   (143) processing a present-day specific day information charge discount rate;
   (142) otherwise, the further step of:
   (144) processing a day-before-specific day information charge discount rate.

6. A method, as set forth in claim 5, wherein said step (143) of processing the present-day specific day information charge discount rate includes the steps of:
   (145) if a designated start time is less than or equal to the present time, the further steps of:

(146, 147) if the designated start time is less than a designated end time, and if the the present time is greater than the designated end time, the further step of:
 (149) designating a second day charging rate as the specific day information charge discount rate;
(146, 147) otherwise, the further step of:
 (148) designating a first day charging rate as the specific day information charge discount rate;
(125) otherwise, the further steps of:
 (150) designating the second day charging rate as the specific day information charge discount rate; and
 (151) processing a day-before-specific day information charge discount rate.

7. A method, as set forth in claim 5 or claim 6, wherein said step (144) of processing the day-before-specific day information charge discount rate includes the steps of:
 (152) designating the service subscriber number and a previous day code value as indexes to the flexible charging-by-day/time table in the service subscriber database; and
 (154) if data corresponding to the designated indexes is present in the flexible charging-by-day/time table, and
 (155) if the designated start time is greater than the designated end time, and
 (156) if the present time is greater than the designated end time, the further step of:
  (157) designating the first day charging rate as the specific day information charge discount rate.

8. A method, as set forth in claim 1, wherein said step (111) of calculating the specific time information charge discount rate includes the steps of:
 (160) designating the service subscriber number and a present time code value as indexes to a flexible charging-by-day/time table in the service subscriber database;
 repeating the following steps until reaching the step of ending the calculation of the specific time information charge discount rate:
  (162) if data corresponding to the designated indexes is present in the flexible charging-by-day/time table, the further steps of:
   (165) if a designated start time is greater than the present time, or (166) if the designated start time is less than a designated end time, and (167) the present time is greater than the designated end time, the further steps of:
    (169) designating a second time charging rate as the specific date information charge discount rate;
   (170) if the the present time code value is less than a limit iteration value, the further steps of:
    (171) incrementing the service subscriber number and the present time code value by one, respectively; and
    (172) designating the incremented service subscriber number and present time code as indexes to the flexible charging-by-day/time table in the service subscriber database;
   (170) otherwise, the further step of:
    (end) ending the calculation of the specific time information charge discount rate;
   (165) otherwise, the further steps of:
    (168) designating a first time charging rate as the specific time information charge discount rate; and
    (end) ending the calculation of the specific time information charge discount rate;
  (162) otherwise, the further steps of:
   (163) transmitting the error message; and
   (end) ending the calculation of the specific time information charge discount rate.

9. A method, as set forth in claim 1, wherein said step (112) of calculating the holiday information charge discount rate includes the steps of:
 (180) designating a present date code value as an index to a holiday table;
 (182) if the present date code value is present in the holiday table or if (183) the present date code value is a Sunday, the further steps of:
  (184) designating the service subscriber number and a holiday code value as indexes to a flexible charging-by-day/time table in the service subscriber database;
  (186) if data corresponding to the designated indexes is present in the flexible charging-by-day/time table, the further step of:
   (187) processing a present-date holiday information charge discount rate;
  (186) otherwise, the further step of:
   (188) transmitting the error message;
 (182) otherwise, the further step of:
  (189) processing a date-before holiday information charge discount rate.

10. A method, as set forth in claim 9, wherein said step (187) of processing the present-date holiday information charge discount rate includes the steps of:
 (190) if a designated start time is smaller than or equal to the present time, the further steps of:
  (191) if the designated start time is less than a designated end time and if (193) the present time is greater than the designated end time, the further step of:
   (195) designating a second holiday charging rate as the holiday information charge discount rate;
  (191) otherwise the further step of:
   (194) designating a first holiday charging rate as the holiday information charge discount rate;
 (190) otherwise, the further steps of:
  (192) designating the second holiday charging rate as the holiday information charge discount rate;
  (196) if the designated start time is greater than or equal to the designated end time, the further steps of:
   (197) designating a previous date code value as an index to the holiday table;
   (199) if data corresponding to the designated index is present in the holiday table or if (200) the present day is Monday, the further step of:
    (201) designating the first holiday charging rate as the holiday information charge discount rate.

11. A method, as set forth in claim 9, wherein said step (189) of processing the date-before holiday information charge discount rate includes the steps of:
 (202) designating a previous date code value as an index to the holiday table; and
 (204) if data corresponding to the designated index is present in the holiday table, or if (205) the present day is Monday, the further steps of:
  (206) designating the service subscriber number and the holiday code value as indexes to the flexible charging-by-day/time table in the service subscriber database;

(204) if data corresponding to the designated index value is present in the flexible charging-by-day/time table, the further steps of:
  (210) if a designated start time is greater than the designated end time, and
  (211) if the present time is less than the designated end time, the further step of:
    (212) designating the first holiday charging rate as the holiday information charge discount rate;
  (211) otherwise, the further step of:
    (209) transmitting the error message.

* * * * *